US006792594B1

(12) United States Patent
Negoro et al.

(10) Patent No.: US 6,792,594 B1
(45) Date of Patent: Sep. 14, 2004

(54) APPARATUS FOR PRODUCING SOFTWARE AND METHOD FOR PRODUCING SOFTWARE

(75) Inventors: Fumio Negoro, Kanagawa-ken (JP); Shigeaki Tomura, Chiba-ken (JP)

(73) Assignees: Information System Development Institute, Tokyo (JP); The Institue of Computer Based Software Methodology and Technology, Tokyo (JP)

( * ) Notice: Subject to any disclaimer, the term of this patent is extended or adjusted under 35 U.S.C. 154(b) by 0 days.

(21) Appl. No.: 09/646,098
(22) PCT Filed: Mar. 19, 1999
(86) PCT No.: PCT/JP99/01394
§ 371 (c)(1), (2), (4) Date: Sep. 20, 2000
(87) PCT Pub. No.: WO99/49387
PCT Pub. Date: Sep. 30, 1999

(30) Foreign Application Priority Data

Mar. 20, 1998 (JP) .......................................... 10/071838

(51) Int. Cl.[7] ................................................ G06F 9/44
(52) U.S. Cl. ...................................... 717/106; 717/108
(58) Field of Search ........................ 717/106, 107–109, 717/100, 114–116; 707/103

(56) References Cited

U.S. PATENT DOCUMENTS 5,860,004 A * 1/1999 Fowlow et al. ............. 717/109
6,011,918 A * 1/2000 Cohen et al. ............... 717/106
6,055,369 A * 4/2000 Sawahata et al. ........... 717/109
6,163,878 A * 12/2000 Kohl .......................... 717/100
6,357,039 B1 * 3/2002 Kuper ........................ 717/136

OTHER PUBLICATIONS

Bacher et al. Computer Aided Power Flow Software Engineering and Code Generation. IEEE. 1995. pp. 474–480.*

Vestal. Assuring The Correctness of Automatically Generated Software. IEEE. 1994. pp. 111–118.*

Rahmani et al. Rapid Prototyping Via Automatic Software Code Generation From Formal Specifications: A Case Study.*

Mark et al. Generating Customized Software Engineering Information Bases From Software Process and Product Specifications. IEEE. 1989. pp. 587–595.*

(List continued on next page.)

*Primary Examiner*—Wei Y. Zhen
(74) *Attorney, Agent, or Firm*—Oblon, Spivak, McClelland, Maier & Neustadt, P.C.

(57) ABSTRACT

With software for any fields, to the effect that software is created automatically only by means of mechanical algorithm, but not depending upon personal abilities such as SE's experience, knowledge, application ability, etc., that is, based on the LYEE theory, definitive identifier, word identifier, W04 Autopoiesis vector which is undefined with the inducing data to introduce the process route and the setting value, W04 Duplication element, W04 Autopoiesis vector, W02 Autopoiesis vector, W03 Duplication element and W03 Autopoiesis vector, and Palette Function are memorized in advance, and, per every word, definitive identifiers, word identifiers, process routes and inducing data into are entered and definitive identifiers entered per every word, word identifiers, process routes and inducing data are allocated into the prescribed locations of the undefined W04 Duplication element, W04 Autopoiesis vector, W03 Duplication element, W03 Autopoiesis vector and the Palette Function. This invention is useful for the creation and maintenance of software.

2 Claims, 11 Drawing Sheets

OTHER PUBLICATIONS

WO 97/16784 A1, Fumio Negoro, May 9, 1997 & EP 859313.*

JP 5–88863 A, Kyoraku Co. LTD, Apr. 9, 1993.*

JP 4–142622 A, Oki Electric Industry Co. LTD, May 15, 1992.*

WO 98/19232 A1, Fumio Negoro, May 7, 1998.*

* cited by examiner

FIG. 12

| SCREEN ID | GSOI08 | NAME OF SCREEN | BALANCE INQUIRY | | | | | | | |
|---|---|---|---|---|---|---|---|---|---|---|
| NUMBER OF ITEM | NAME OF WORD | WORD IDENTIFIER | I/O | NUMBER OF COLUMNS | ATTRI-BUTE | FILE TO USE | R-NO | PF-KEY | NEXT SCREEN IDENTIFIER | WORD DEFINITION |
| 1 | PASSWORD NUMBER | PASSNO1 | I | 4 | 9 | 8 | | | | |
| 2 | CLIENT NEME | CLNAME 0 | O | 25 | X | 8 | | | | |
| 3 | BALANCE OF DEPOSIT | YOKNZAN | O | 9 | 9 | 7 | | | | |
| 4 | MESSAGE | MSSGCD1 | O | 50 | X | | | | | |
| 5 | END | PF3KEY | | 1 | 9 | | 3 | PF3KEY | GSMENU | |
| 6 | EXECUTE | PF25KEY | | 1 | 9 | | 1 | PF25KEY | GSOI08 | |
| 7 | DEPOSIT LEDGER (FMOTOFIL) | FMOTO-REC | | | | | RD1 | | | |
| 8 | CLIENT LEDGER (FSHINFIL) | FSHIN-REC | | | | | RK1 | | | |
| 9 | | | | | | | | | | |
| 10 | | | | | | | | | | |

APPARATUS FOR PRODUCING SOFTWARE AND METHOD FOR PRODUCING SOFTWARE

TECHNOLOGY FIELD

This invention relates to software creation devices and software creation methods applied to business software, games software and all other fields' software.

BACKGROUND TECHNOLOGY

Traditional software has been created through the steps of requirement definition, basic design, detail design, programming, compile, program test and general test. A series of these steps are implemented by SE's personal abilities including experience, knowledge, applying abilities, etc.

Accordingly, an imagination of automatic creation of software itself is a reckless attempt in reality, and the purpose can be said to be unpredictable in the said field.

Nevertheless, this invention has a purpose to provide software creation device and software creation method that allows automatic creation of software by means of mechanical algorithm only, without necessitating personal abilities including SE's personal abilities including experience, knowledge, applying abilities, etc.

The background of this invention which realizes the aforementioned can be found in the universal structural proposition of software, that is, the premise of the LYEE proposition which enables the determination of software existing as the one and only against the requirement event. As a result, it can provide software creation device and software creation method in order to realize the productivity improvement, the quality uniformity and the easy maintenance.

This invention has been achieved to attain the above purpose.

DISCLOSURE OF THE INVENTION

This invention presents a software creation devise, said software comprising:
(a) Means for having W04 Duplication element and W04 Autopoiesis vector for performing screen editing, W02 Autopoiesis vector for determining the process route, W03 Duplication element and W03 Autopoiesis vector for performing data editing for file update, all of which have an indefinitive part to be allocated with a definitive identifier and a word identifier corresponding respectively to screen, file or voucher (screen, file and voucher being called 'definitive' hereinafter) necessary for software to be produced, and to the word existing on the definitive at the same time are defined as universal structure regardless of the kinds or the functions of the software, wherein:
(a-1) The W04 Duplication element, if the data area of W03 identified by the same word's identifier is not "empty", sets a data value of W03 data area identified by the same word identifier into the data area identified by the word
(a-2) The W04 Autopoiesis vector, if the data area of W04 identified by the word identifier is not "empty" and when a refusal flag of W02 or W03 identified by the same word identifier has been set, sets a refusal code and resets a refusal flag, and if the data area of W04 identified by the word identifier is "empty", introduces and sets a data into the data area of W04 identified by the word identifier from the data area of W04 identified by an identifier of the other words rather than the word, and, when the restart is possible even if the aforementioned data introduction cannot be done, sets a restart flag or, when restart is not possible, sets a refusal code identified by the same word identifier;
(a-3) The W02 Autopoiesis vector, if the data area of W02 identified by the word identifier is not "empty", sets a process route flag, and when a process route flag setting is refused and a restart is possible, sets a restart flag, or when a restart is impossible, sets a refusal flag identified by the same word identifier;
(a-4) The W03 Duplication element, if the data area of W02 identified by the same word identifier is not "empty", sets a data value of W02 data area identified by the same word identifier into the data area identified by the word identifier of the W03;
(a-5) The W03 Autopoiesis vector, if the data area of W03 identified by the word identifier is "empty", does one of the followings: (i) setting a data from the data area of W02 identified by the word identifier in a predetermined way; or (ii) setting a data from the data area of W03 identified by the word identifier on file in a predetermined way; or (iii) setting a data into the data area of W03 identified by the word by use of the provided calculation equation, and, when the restart is possible even if the aforementioned data setting value cannot be done, sets a restart flag or, when the restart is not possible, sets a refusal flag identified by the same word identifier;
(b) A group of pallets having W04 pallet for putting together executably, per screen, each W04 Duplication element and W04 Autopoiesis vector corresponding to the word identifier of the word existing on the screen into an order of the Duplication element group and the Autopoiesis vector group and for assembling each W04 data area identified by each word identifier; W02 pallet for putting together executably, per screen, each W02 Autopoiesis vector corresponding to the word identifier of the word existing on the screen and for assembling each W02 data area identified by each word identifier; and W03 pallet for putting together executably each W03 Duplication element and W03 Autopoiesis vector corresponding to the word identifier of the word existing on the whole definitive in the system into an order of the Duplication element group and the Autopoiesis vector group and for assembling each W03 data area identified by each word identifier;
(c) W04, W02, and W03 pallet function means for executing each Duplication element and Autopoiesis vector inside the corresponding pallet, and re-executing each Duplication element and Autopoiesis vector inside the pallet if a pallet restart flag in the pallet has been set, each means having an indefinitive part to be allocated with the definitive identifier and the word identifier, at the same time being defined as universal structure regardless of the kinds or the functions of the software;
(d) Pallet chain function means for executing the W04 pallet; sending a screen data based on the execution onto a computer screen; receiving a screen data corresponding to the sent screen data and executing the W02 pallet; determining a process route based on the process route flag of the W02 pallet; and executing the W03 pallet accorded in the determined process route, said means defined as universal structure regardless of the kinds or the functions of the software, wherein the software creation device comprises:
Memory means for memorizing, in advance, the W04 Duplication element, the W04 Autopoiesis vector, the W02 Autopoiesis vector, the W03 Duplication element, W03 Autopoiesis vector, and the pallet group of the (b), each pallet function means of the (c) and pallet chain function means of the (d), all of whose definitive identifier, word identifier, process route and, if it applies, calculation equation, are undefined;

Means for inputting, per the word, the definitive identifier, the word identifier, the process route, input or output attribute of the word and, if it applies, the calculation equation;

Allocating means for allocating, per the word, the definitive identifier, the word identifier, the process route, and, if it applies, the calculation equation into the prescribed locations of the memorized undefined W04 Duplication element, W04 Autopoiesis vector, W02 Autopoiesis vector, W03 Duplication element, W03 Autopoiesis vector, the pallet group of (b), the pallet function means of the (c), and for creating, in W03 Autopoiesis vector, a data setting description corresponding to the (i) (ii) (iii) based on input and output attribute to the corresponding word and, if it applies, the calculation equation;

Means for obtaining objective software by combining the consequence of the allocating means and the pallet chain function means memorized by the memory means.

Also this invention provides a software creation method, said software comprising:

(a) Means for having W04 Duplication element and W04 Autopoiesis vector for performing screen editing, W02 Autopoiesis vector for determining the process route, W03 Duplication element and W03 Autopoiesis vector for performing data editing for file update, all of which have an indefinitive part to be allocated with a definitive identifier and a word identifier corresponding respectively to screen, file or voucher (screen, file and voucher being called 'definitive' hereinafter) necessary for software to be produced, and to the word existing on the definitive, at the same time are defined as universal structure regardless of the kinds on the functions of the software, wherein:

(a-1) The W04 Duplication element, if the data area of W03 identified by the same word's identifier is not "empty", sets a data value of W03 data area identified by the same word identifier into the data area identified by the word identifier of the W04;

(a-2) The W04 Autopoiesis vector, if the data area of W04 identified by the word identifier is not "empty" and when a refusal flag of W02 or W03 identified by the same word identifier has been set, sets a refusal code and resets a refusal flag, and if the data area of W04 identified by the word identifier is "empty", introduces and sets a data into the data area of W04 identified by the word identifier from the data area of W04 identified by an identifier of the other words rather than the word, and, when the restart is possible even if the aforementioned data introduction cannot be done, sets a restart flag or, when restart is not possible, sets a refusal code identified by the same word identifier;

(a-3) The W02 Autopoiesis vector, if the data area of W02 identified by the word identifier is not "empty", sets a process route flag, and when a process route flag setting is refused and a restart is possible, sets a restart flag, or when a restart is impossible, sets a refusal flag identified by the same word identifier;

(a-4) The W03 Duplication element, if the data area of W02 identified by the same word identifier is not "empty", sets a data value of W02 data area identified by the same word identifier into the data area identified by the word identifier of the W03;

(a-5) The W03 Autopoiesis vector, if the data area of W03 identified by the word identifier is "empty", does one of the followings: (i) setting a data from the data area of W02 identified by the word identifier in a predetermined way; or (ii) setting a data from the data area of W03 identified by the word identifier on file in a predetermined way; or (iii) setting a data into the data area of W03 identified by the word by use of the provided calculation equation, and, when the restart is possible even if the aforementioned data setting value cannot be done, sets a restart flag or, when the restart is not possible, sets a refusal flag identified by the same word identifier;

(b) A group of pallets having W04 pallet for putting together executably, per screen, each W04 Duplication element and W04 Autopoiesis vector corresponding to the word identifier of the word existing on the screen into an order of the Duplication element group and the Autopoiesis vector group and for assembling each W04 data area identified by each word identifier; W02 pallet for putting together executably, per screen, each W02 Autopoiesis vector corresponding to the word identifier of the word existing on the screen and for assembling each W02 data area identified by each word identifier; and W03 pallet for putting together executably each W03 Duplication element and W03 Autopoiesis vector corresponding to the word identifier of the word existing on the whole definitive in the system into an order of the Duplication element group and the Autopoiesis vector group and for assembling each W03 data area identified by each word identifier;

(c) W04, W02, and W03 pallet function means for executing each Duplication element and Autopoiesis vector inside the corresponding pallet, and re-executing each Duplication element and Autopoiesis vector inside the pallet if a pallet restart flag in the pallet has been set; each means having an indefinitive part to be allocated with the definitive identifier and the word identifier, at the same time being defined as universal structure regardless of the kinds or the functions of the software;

(d) Pallet chain function means for executing the W04 pallet; sending a screen data based on the execution onto a computer screen; receiving a screen data corresponding to the sent screen data and executing the W02 pallet; determining a process route based on the process route flag of the W02 pallet; and executing the W03 pallet accorded in the determined process route, said means defined as universal structure regardless of the kinds or the functions of the software, wherein the software creation device comprises:

Memorizing, in advance, the W04 Duplication element, the W04 Autopoiesis vector, the W02 Autopoiesis vector, the W03 Duplication element, W03 Autopoiesis vector, and the pallet group of the (b), each pallet function means of the (c) and pallet chain function means of the (d), all of whose definitive identifier, word identifier, process route and, if it applies, calculation equation, are undefined; Inputting, per the word, the definitive identifier, the word identifier, the process route, input or output attribute of the word and, if it applies, the calculation equation; Allocating, per the word, the definitive identifier, the word identifier, the process route, and, if it applies, the calculation equation into the prescribed locations of the memorized undefined W04 Duplication element, W04 Autopoiesis vector, W02 Autopoiesis vector, W03 Duplication element, W03 Autopoiesis vector, the pallet group of (b), the pallet function means of the (c), and for creating, in W03 Autopoiesis vector, a data setting description corresponding to the (i) (ii) (iii) based on input and output attribute to the corresponding word and, if it applies, the calculation equation;

Obtaining objective software by combining the consequence of the allocation and the pallet chain function means memorized by the memory means.

With this invention, a new software production method has been already advocated (One is International Disclosure Number WO97/16784. The other is International Patent Application Number PCT/JP97/01492). This is what is called LYEE (Governmental Methodology for Software Providence). The theorem of LYEE is as follows: "It can establish the one and only logical function that can synchronize the software requirement into a computer space. By designating the logical function by T0, the computer space can be expressed by $T0^n$ ($n \geq 1$). T0 is called Scenario Function."

Hereupon, the Scenario Function is:

$$T0 = \Phi 0 \ (\{\Phi p \ \{L_E, i, W02\} \ E\} \ e + \Phi p \ \{Y_D, i, W03 \cdot L_D, i, W03\} \ d + \Phi p \ \{Y_E, i, W04 \cdot L_E, i, W04\} \ E\} \ e)$$

Here, $\Phi p \ \{L_E, i, W02\} \ E = W02$ palette $\Phi p \ \{Y_D, i, W03 \cdot L_D, i, W03\} \ d = W03$ palette $\Phi p \ \{Y_E, i, W04 \cdot L_E, i, W04\} \ E = W04$ palette E: an independent variable called definitive's identifier consisting of event information like screen, message, etc.
e: an independent variable of kinds of E existing in the developing system.
D: an independent variable called identifier of definitive's like screen, message, file, etc. (E is contained in D).
d: an independent variable of kinds of D existing in the developing system (e is contained in d).
i: an independent variable called an identifier of words (data items) contained in E and D.
Y: Called a Duplication element and is a function to perform synchronization between meaning domains.
L: It is called a Autopoiesis vector and a function to perform synchronization with memory if memory exists, or to perform operational synchronization if memory does not exist. Its logical structure is uniquely defined as shown in FIGS. 4 to 7.
$\Phi p \ \{ \ \}$: Called a Palette function and a function to assemble a set of Duplication element $Y_D$, i, Wn and Autopoiesis vector $L_D$, i, Wn. A set of the Duplication element, Autopoiesis vector and data area, D, I, Wn, is called a palette.
W02, W03, W04: Meaning domain identifiers (The meaning domain occurrence order is fixed as W04→W02→W03).
$\Phi 0$: Called a Pallet Chain Function and a function to chain palettes (The palette chaining order is fixed as W04→W02→W03).

The Duplication element, Autopoiesis venctor and palette function shown in FIGS. 4 to 7 have only variables of "D, I", if parts of "Data Autopoiesis" in Autopoiesis vector shown in FIGS. 5 and 7 and "process route" in Autopoiesis vector shown in FIG. 6 are excluded. Reversibly speaking, if the parts of "Data Autopoiesis", "process route", and "D, I" are only defined, Duplication element, Autopoiesis vector and palette function can be determined, that is, a program having that Duplication element, Autopoiesis vector and palette function can be determined. Also, Pallet Chain Function is absolutely the one and only program. This invention notes this point. That is, Duplication element, Autopoiesis vector and palette function, with the "Data Autopoiesis" part, the "process route" part and "D, I" are yet undefined, are prepared in advance, as well as providing, in advance, a relationship between the definition table and the undefined parts of Duplication element, Autopoiesis vector, and palette function, and this facility consequently enables to automatically create software simply by inputting the "Data Autopoiesis" part, the "process route" part and "D, I" into, for example, the definition table.

BRIEF EXPLANATION OF DRAWINGS

FIG. 12 is a diagram showing an example of the Definitive Table of this invention.

BEST EMBODIMENT OF THIS INVENTION

Hereunder, in order to describe this invention in detail, an explanation is made in accordance with the attached drawings.

First, an explanation is made for the composition of software based on the LYEE theory.

Figure 1:
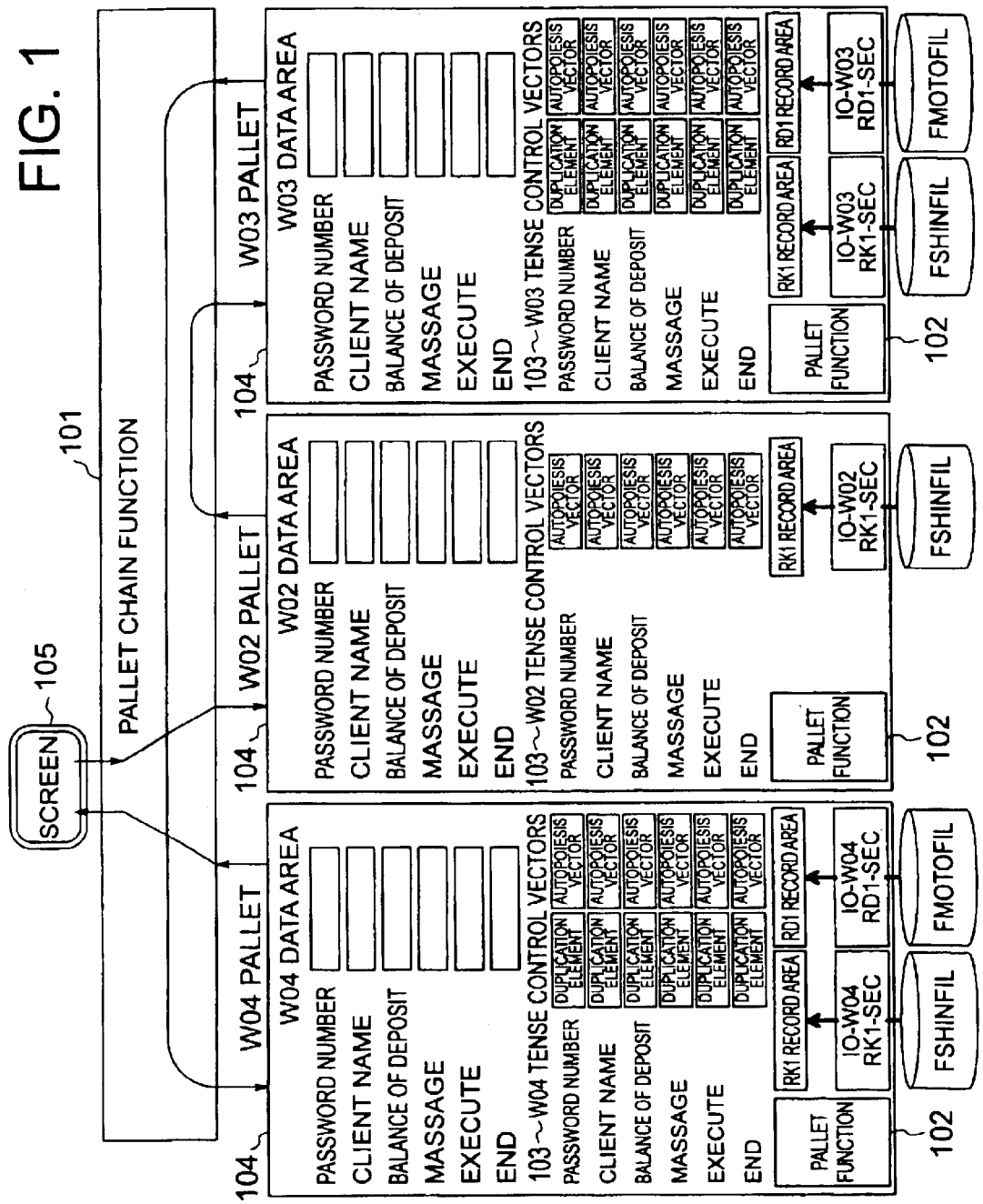
FIG. 1 is a composite diagram of LYEE of this invention.

FIG. 1 is a diagram approximately showing the composition of software based on the LYEE theory. Software based on the LYEE theory always takes a structure as shown in FIG. 1, that is, a structure where each Palette 104, in which each Tense Control vector 103 is assembled into each Palette Function 102, causes a chaining (or making Unit-Team) by Pallet Chain Function 101.

Pallet Chain Function 101, Palette Function 102 and Tense Control vector 103 are respectively regulated in uniformity up to the step 1 level, based on the aforementioned LYEE theory.

In Tense Control Vector 103, W04 Tense Control vector, W02 Tense Control Vector and W03 Tense Control vector are mounted. Palette 104, in which W04 Tense Control vector is assembled into Palette Function 102, is called W04 Palette. Palette 104, in which W02 Tense Control vector is assembled into Palette Function 102, is called W02 Palette. Palette 104, in which W03 Tense Control-vector is assembled into Function 102, is called W03 Palette. In each Palette, a data area is built in, as shown in FIG. 1, which is identified by an identifier of the corresponding word holding word data per every word. The data area of W04 Palette is called W04 data area, the data area of W02 Palette is called W02 data area, and the data area of W03 Palette is called W03 data area.

In W04 Tense Control vector, there are Duplication element and Autopoiesis vector. These are called W04 Duplication element and W04 Autopoiesis vector, respectively. In W02 Tense Control vector, there is Autopoiesis vector. This is called W02 Autopoiesis vector. In W03 Tense Control vector, there are Duplication element and Autopoiesis vector. These are called W03 Duplication element and W03 Autopoiesis vector, respectively.

W04 Duplication element and W04 Autopoiesis vector are program elements to implement display screen editing. W02 Autopoiesis vector is a program element to determine the process route. W03 Duplication element and W03 Autopoiesis vector are program elements to implement data editing for file update.

These Tense Control vectors 103 are created against all words existing on the Screen 105 (including display, files or vouchers) which is necessary to intervene data used by the software to be produced. Speaking of the example of FIG. 1, if words, for example, such as 'password number', 'client name', balance of deposit', 'message', 'execute' and 'end' exist on the Screen 105, Tense Control vectors against these respective words are created. Further to add, among Tense Control vectors, W04 Duplication element, W04 Autopoiesis vector and W02 Autopoiesis vector are what to implement screen edit, respectively and to determine the process route, so they are defined per every screen, but W03 Duplication element and W03 Autopoiesis vector are what to implement data edit for file update, so they are defined as one piece of Palette formed by binding all definitives within the system. For example, as for the word 'password number', W04 Duplication element, W04 Autopoiesis vector and W02 Autopoiesis vector must be respectively defined separately per every screen, even if the same word. And, words respectively defined separately can be defined individually as W03 Autopoiesis vector as they are.

To each of these Tense Control vectors, a meaning domain identifier, a definitive identifier and a word identifier are attached.

Figure 2:
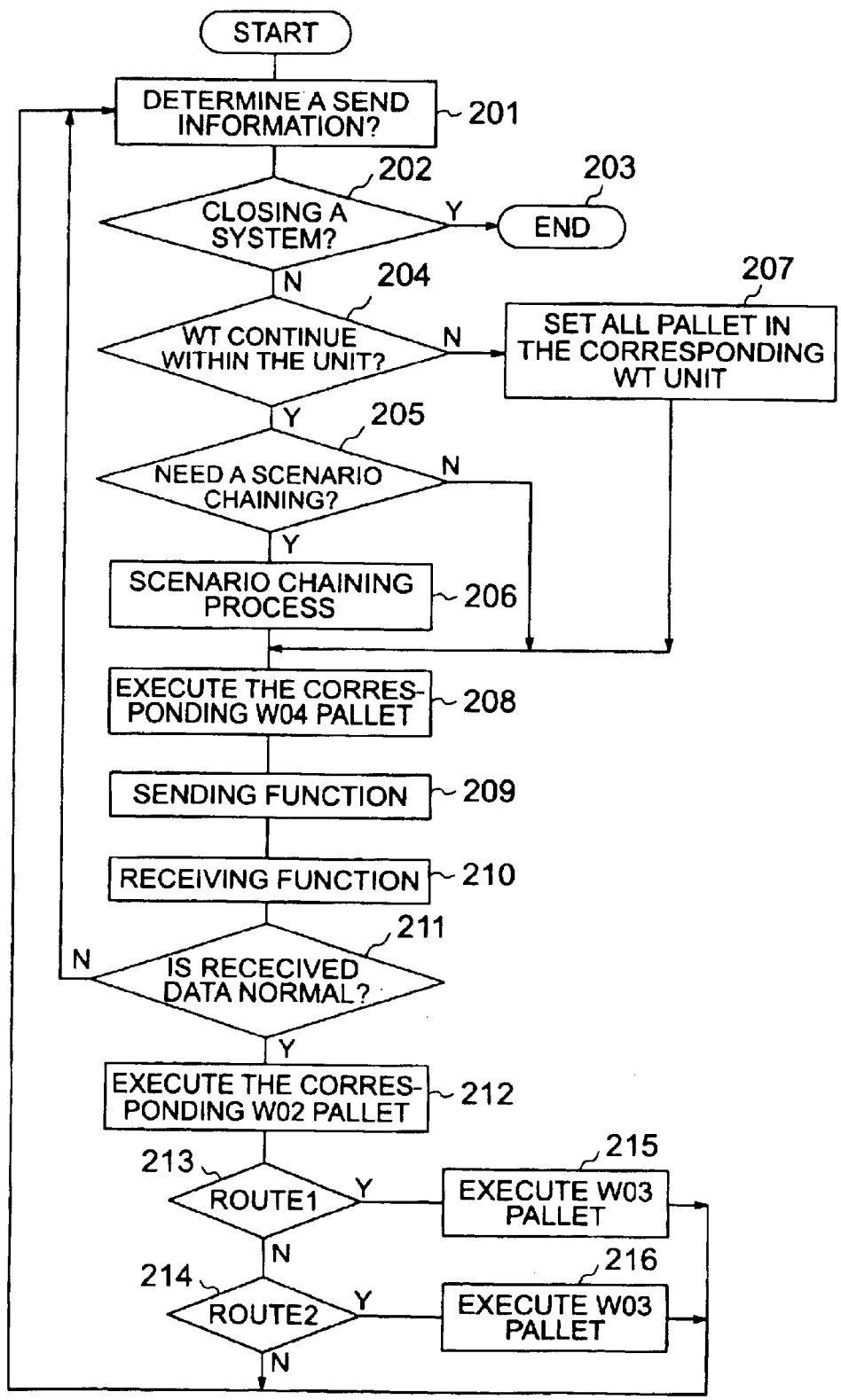
FIG. 2 is a flow chart of Pallet Chain Function of this invention.

FIG. 2 is a flow chart showing a structural paradigm of Pallet Chain Function 101.

The structure of the Pallet Chain Function 101 is always the same in any software. Accordingly, a Palette 104 to be created can be assembled into the Pallet Chain Function 101 already prepared in advance.

That is, determine a SEND information at first (Step 201). The SEND information means display data on Screen 105 which is displayed on a computer.

Figure 11:
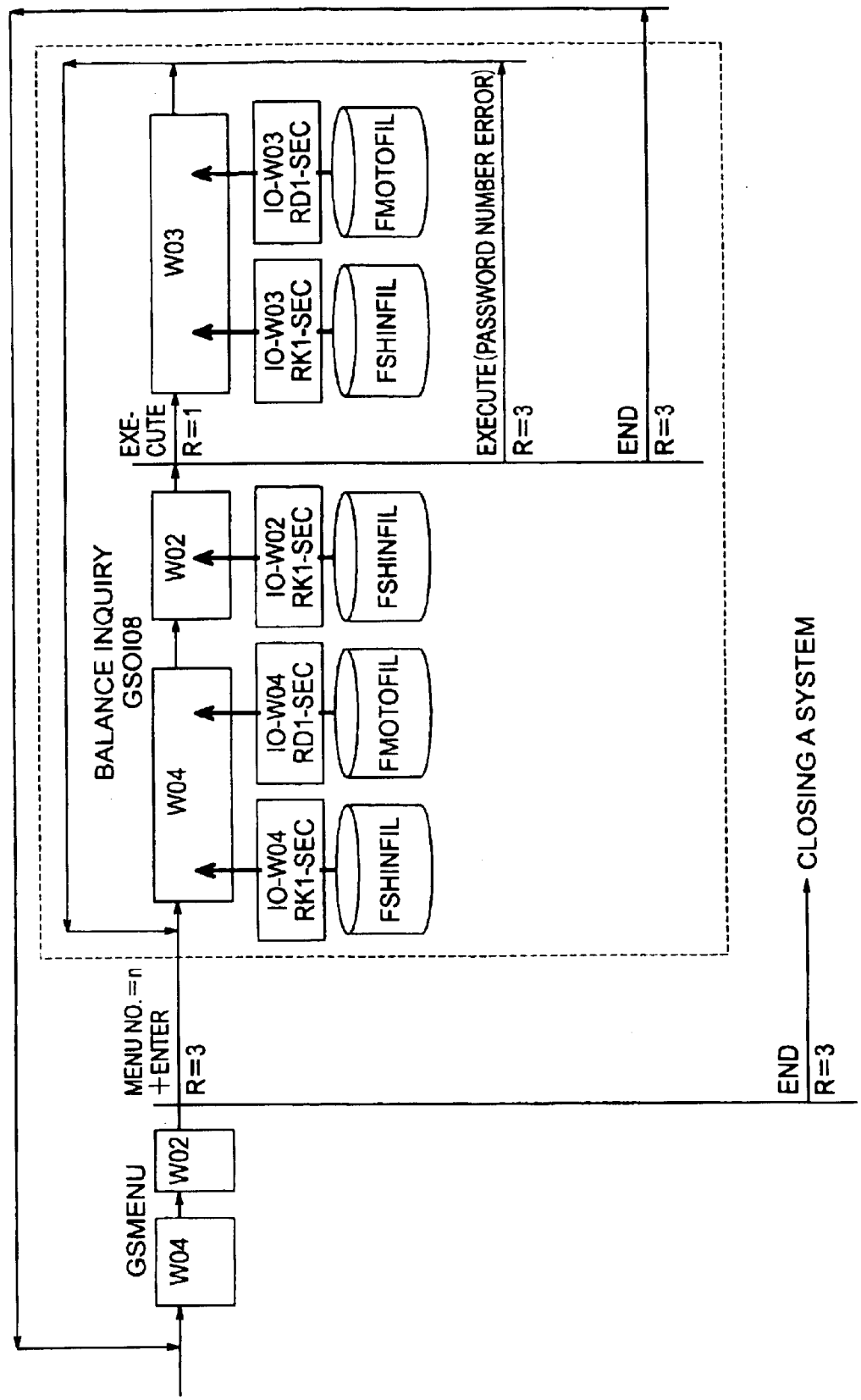
FIG. 11 is a diagram showing an example of Homogeneity Map (or process route diagram) of this invention.

For example, speaking by referring to a process route diagram (or Homogeneity Map, whose details will be described later) shown in FIG. 11, in the menu screen GSMENU (GSMENU is a definitive identifier of the menu screen), if 'Balance Inquiry' is selected (meaning, for example, an operation of 'Menu No=n+ENTER' in the menu screen GSMENU), it will determine Screen GSOI08 (GSOI08 is a definitive identifier of the balance inquiry screen) of 'Balance Inquiry' as a SEND information.

When an information closing a system is included in the SEND information (an operation of 'END' in the menu screen GSMENU) (Step 202), the system will be closed (Step 203). To close a system means to return to OS, for example.

Next, make judgment on whether or not to continue within the WT (walk-through) unit (Step 204). This relates to an exceptional process. That is, the WT unit is, for example, what is formed in one unit by binding an Entry Screen used for entering data and a Reference Screen used for referring to data in advance of the entry of the data. If not continued within the WT unit, The whole Palette is set with a new WT unit (Step 207).

Next, execute the corresponding W04 Palette (Step 208). That is, to execute W04 Palette in which Tense Control vectors 103 of all W04s, i.e., W04 Duplication element and W04 Autopoiesis vector, has been set in the Palette Function 102. With this, the data value of the screen to be displayed will be determined.

Then, execute a SEND function (Step 209). That is, to SEND a screen with data values, etc. set as a screen data to be displayed on a computer.

Thereafter, execute a RECEIVE function (Step 210). That is, to RECEIVE a screen data with data values, etc. entered on the screen of a computer.

And, make judgment on whether the RECEIVE data is normal or not (Step 211), and if it is abnormal, do over again from the beginning. That is, check whether illegal data, etc. exists or not.

Next, execute the corresponding W02 Palette (Step 212). That is, to execute W02 Palette in which a Tense Control vector of all W02s, i.e., W02 Autopoiesis vector, has been set in the Palette Function 102. With this, data, etc. entered on the screen of a computer will be determined.

Next, determine a process route (Step 213, 214). The process route is judged by the Process Route Flag (R=1–5) on the W02 Autopoiesis vector.

When the process route flag is R=1, the corresponding W03 Palette (W03 Palette not accompanying an entry to file) will be executed (Step 215). And, it returns to the initial process (Step 201). The process route R=1 is a process route only implementing the execution of data process.

When the process route flag is R=2, the corresponding W03 Palette (W03 Palette accompanying an entry to file) will be executed (Step 216). And, it returns to the initial process (Step 201). The process route R=2 is a process route to implement the execution of data process and the entry to file.

When the process route flag is R=3–5, it returns, let alone, to the initial process (Step 201).

Here, the process route R=3 is a process route, let alone, returning to W04 Palette (either the same or different one).

The process route R=4 is a process to enter data into file as it is.

The process route R=5 is a process to fetch data from file as it is.

Figure 3:
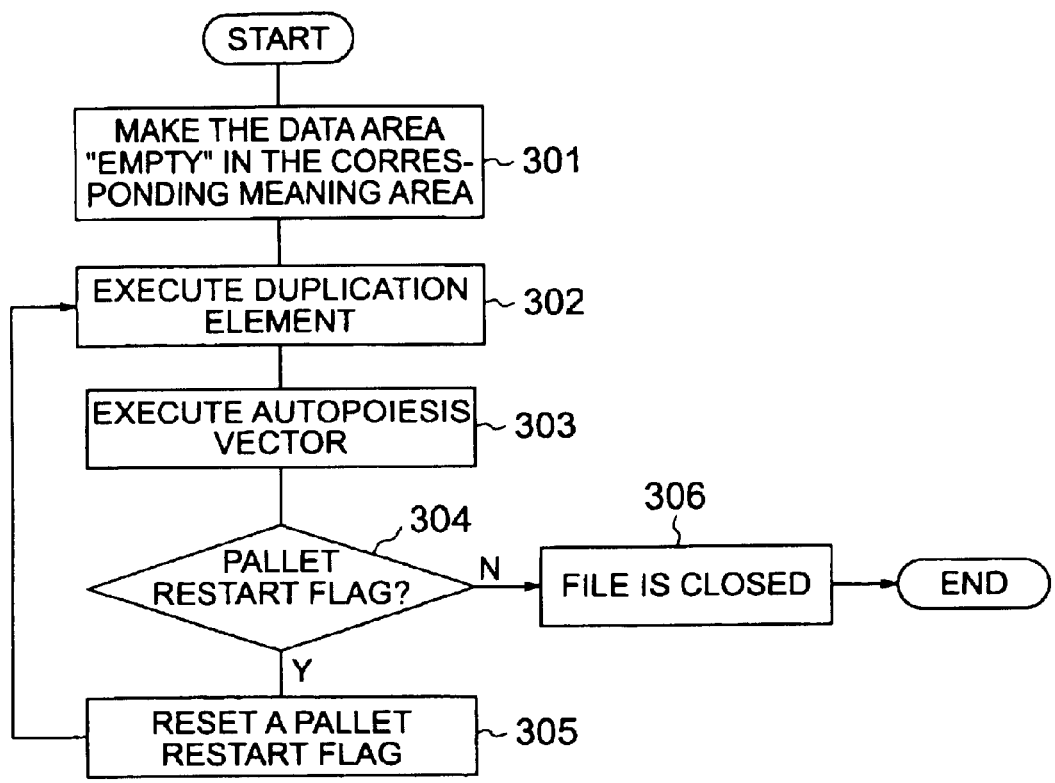
FIG. 3 is a flow chart of Palette Function of this invention.

FIG. 3 is a flow chart showing a structural paradigm of Palette Function.

It is necessary to create a Palette Function like this for respective Tense Control vector of W02, W03 and W04.

First, make the data area "Empty" (Step 301). That is, for example, with a Palette Function of W04, make "Empty" a data area with an identifier attached to per every word existing in the corresponding screen. However, the Palette Function on W02 only is not made "Empty." And, execute each Duplication element and Autopoiesis vector in sequence (in the order of Duplication element group and Autopoiesis vector group) (Step 302, 303).

Thereafter, when a palette restart flag has been set (Step 304), reset a flag (Step 305) and re-execute each Duplication element and Autopoiesis vector in sequence (in the order of Duplication element group and Autopoiesis vector group) (Step 302, 303). On the other hand, when a palette restart flag has not been set, File is closed (Step 306) and a process is ended. Here, "File" is what to 'memorize' a data value self-decided by the Tense Control vector of W03, and it is established for every word. Further to add, with the reproduction of data memorized in File, original files for reproduction are different per every word, so it is done in the subroutine of the Self-Decision part of Autopoiesis vector of every word. And, Open and Read of File is executed inside the subroutine, and Close is executed in one lot by the Palette Function.

Palette Restart is judged by the restart flag on each Autopoiesis vector.

Figure 4:
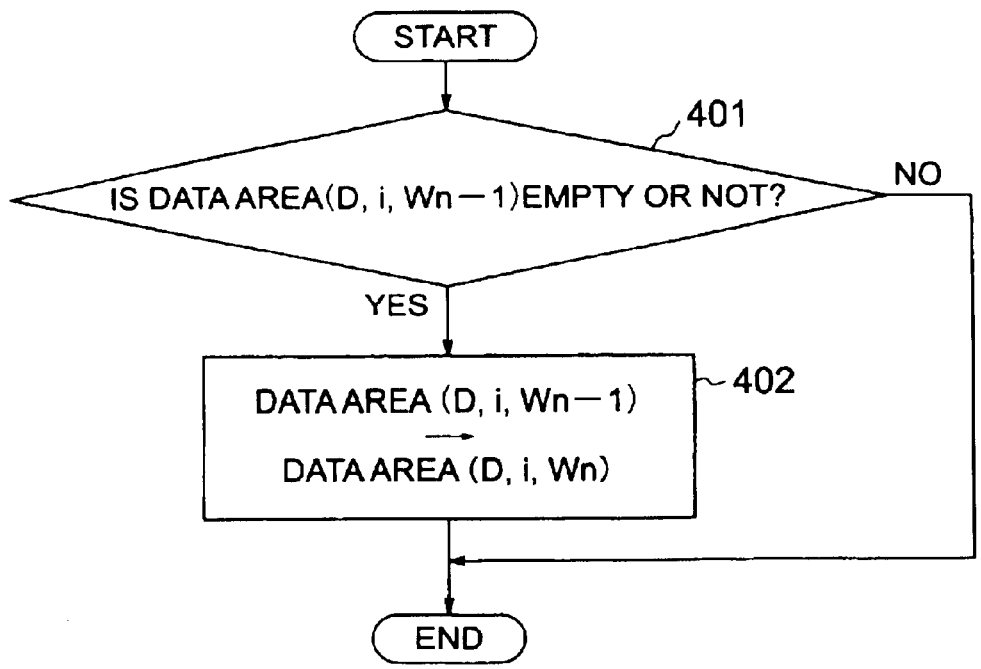
FIG. 4 is a flow chart of Duplication element of this invention.

FIG. 4 is a flow chart showing a structural paradigm of Duplication element of Tense Control vector. By designating Duplication element as Y (D, i, Wn), make judgment on whether the data area is Empty or not of the D, i, Wn−1 (D indicates a screen identifier and Wn−1 indicates W02 if, for example, Duplication element is W02) (Step 401).

When Empty, end Duplication element (D, i, Wn).

When not Empty, shift data in the data area of D, i, Wn−1 into the data area of D, i, Wn and end it (Step 402).

Figure 5:
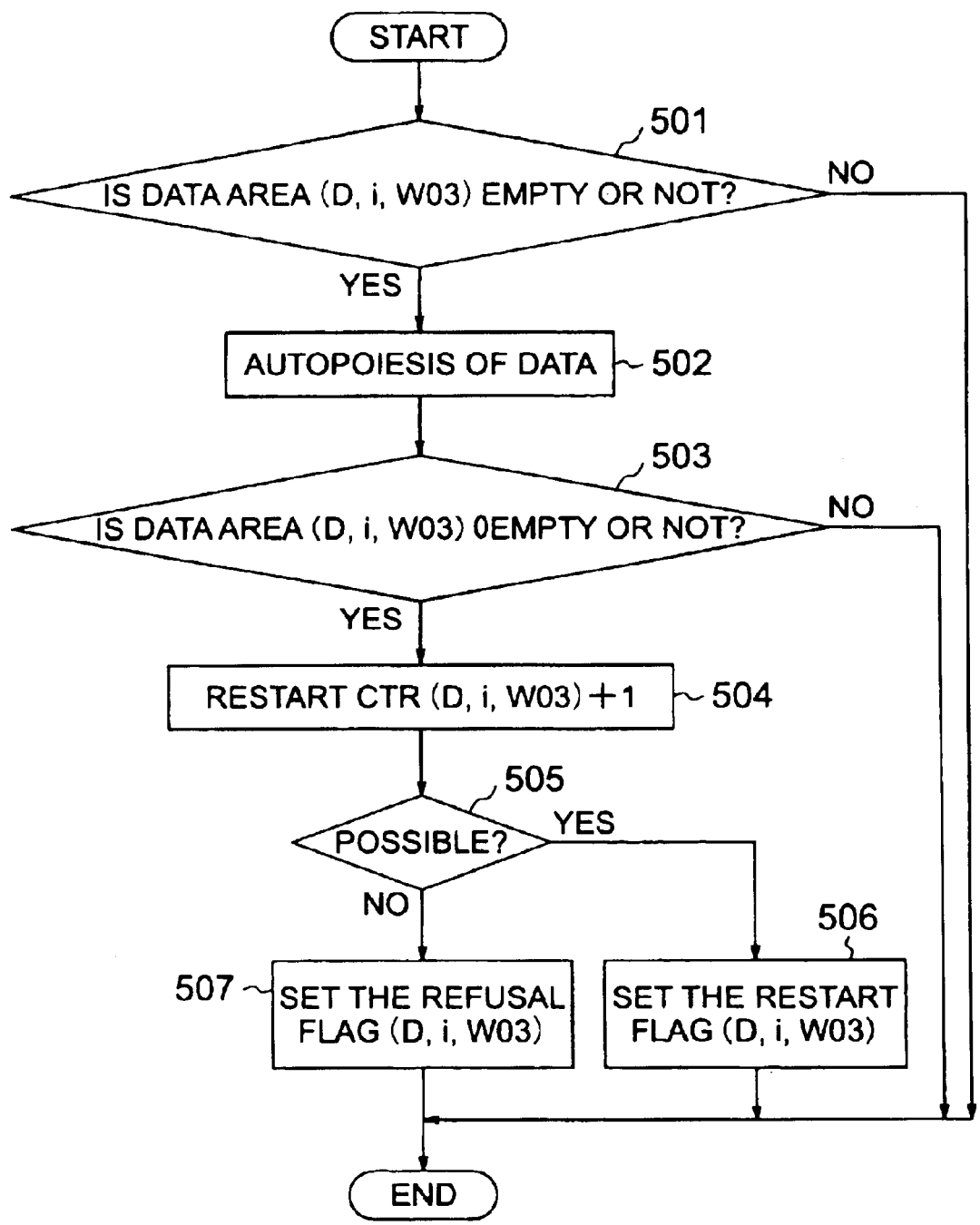
FIG. 5 is a flow chart of W03 Autopoiesis vector of this invention.

FIG. 5 is a flow chart showing a structural paradigm of Autopoiesis vector W03 of Tense Control vector. By designating Autopoiesis vector as L (D, i, W03), make judgment at first on whether the data area (D, i, W03) is Empty or not (Step 501).

When data already exists in the data area (D, i, W03) and it is not Empty, end Autopoiesis vector (D, i, W03).

When no data exists in the data area (D, i, W03) and it is Empty, Self-Decision of data is done (Step 502). The self-Decision means, for example, to shift data of data area (D, i, W02) into data area (D, i, W03) when data is an input attribute, and, for example, to perform Self-Decision of data from data of the same word of File when data is an output attribute, and, for example, to perform Self-Decision of data by operating from data of the other word when the data is likewise an output attribute.

Next, make judgment on whether the data area (D, i, W03) is Empty or not (Step 503).

When data becomes existing in the data area (D, i, W03), it is acknowledged that the Self-Decision has been established and it ends Autopoiesis vector L ((D, i, W03).

When no data exists in the data area (D, i, W03), add "1" to the restart counter of the D, i, W03 (Step 505).

When the restart is possible, set the restart flag (D, i, W03) (Step 506).

When the restart is not possible, set the refusal flag (D, i, W03) (Step 507).

Figure 6:
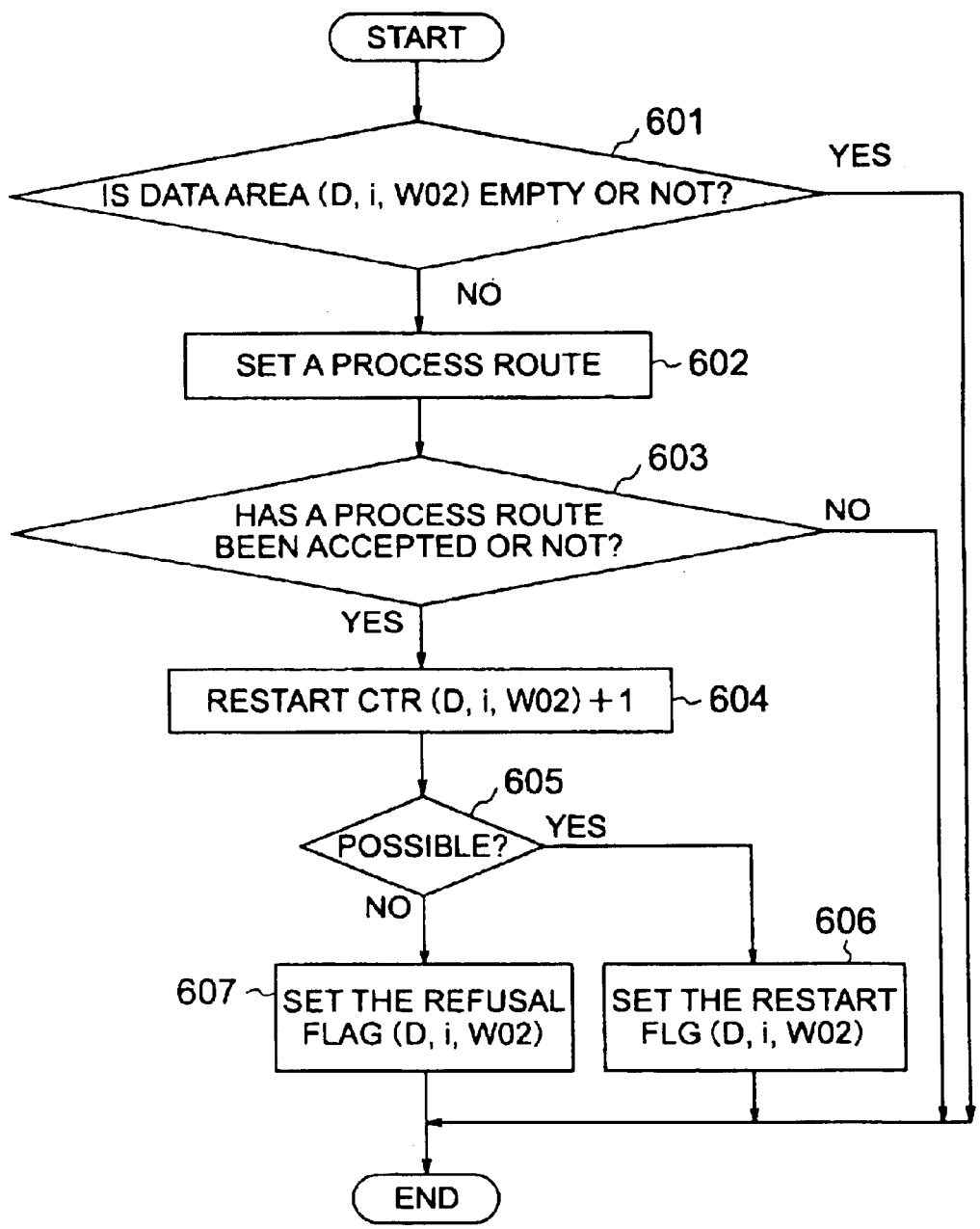
FIG. 6 is a flow chart of W02 Autopoiesis vector of this invention.

FIG. 6 is a flow chart showing a structural paradigm of Autopoiesis vector W02 of Tense Control vector. By designating Autopoiesis vector as L, make judgment, at first, on whether the data area (D, i, W02) is Empty or not (Step 601).

When no data exists in the data area (D, i, W02) and it is Empty, that is, when data input was not done from the screen, end Autopoiesis vector L (D, i, W02).

When data already exists in the data area (D, i, W03) and it is not Empty, set a process route (Step 602). The setting of the process route means to set the aforementioned process route flag (R=1–5).

Next, make judgment on whether a process route has been accepted or not (Step 603).

When the process route has been accepted, end Autopoiesis vector L (D, i, W02).

When the process route has not been accepted, add "1" to the restart counter of the D, i, W02 (Step 604).

Next, make judgment whether a value of the restart counter is below the value fixed in advance, that is, whether the restart is possible or not (Step 605).

When the restart is possible, set the restart flag (D, i, W02) (Step 606).

When the restart is not possible, set the refusal flag (D, i, W02) (Step 607).

Figure 7:
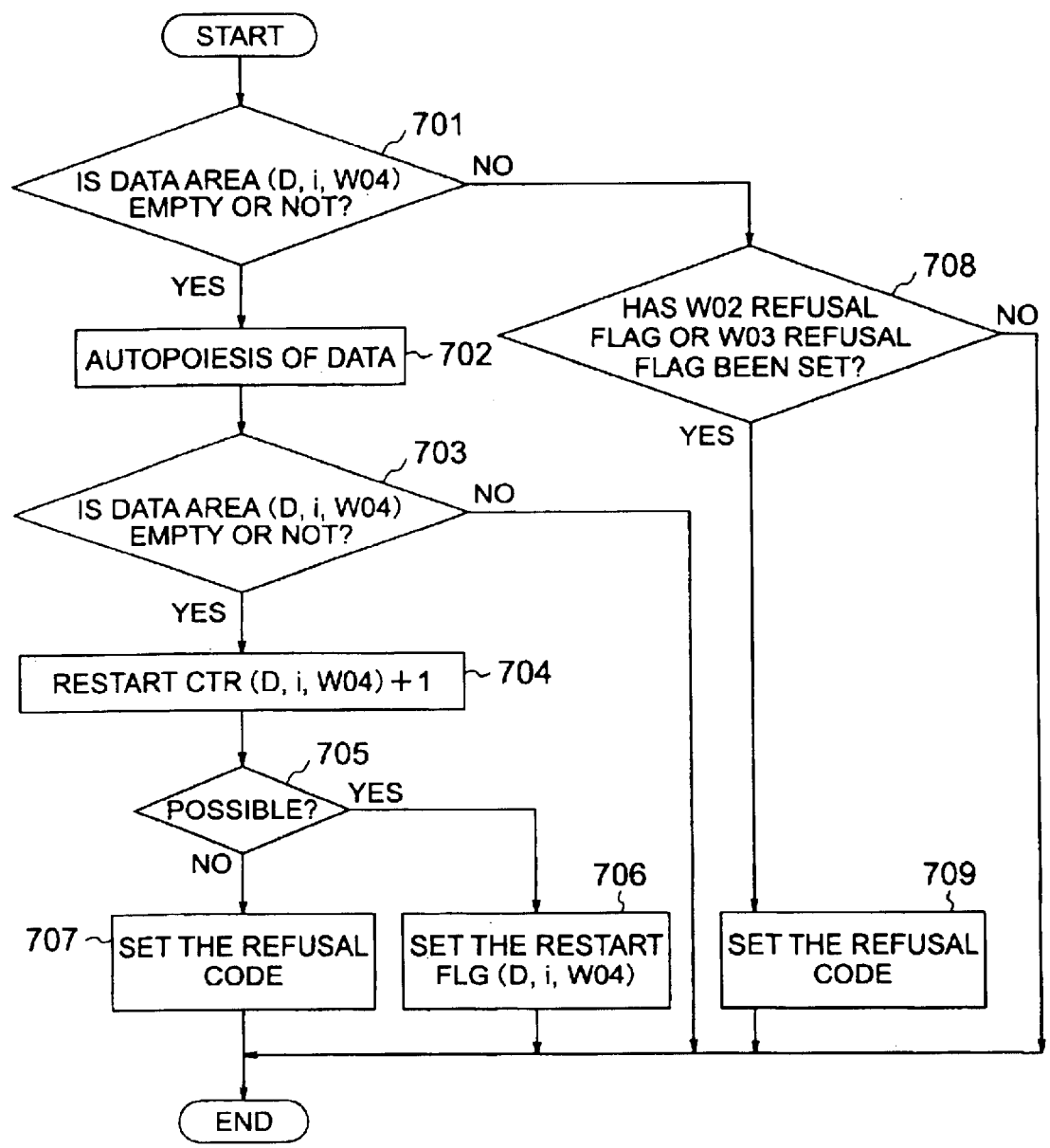
FIG. 7 is a flow chart of W04 Autopoiesis vector of this invention.

FIG. 7 is a flow chart showing a structural paradigm of Autopoiesis vector W04 of Tense Control vector. By designating Autopoiesis vector as L (D, i, W04), make judgment, at first, on whether the data area (D, i, W04) is Empty or not (Step 701).

When no data exists in the data area (D, i, W04) and it is Empty, perform the Self-Decision of data (Step 702). The self-Decision means, for example, to shift data of data area (D, i, W02) into data area (D, i, W04) when data is an input attribute, and, for example, to perform Self-Decision of data from data of the same word of File when data is an output attribute, and, for example, to perform Self-Decision of data by operating from data of the other word when the data is likewise an output attribute.

Next, make judgment on whether the data area (D, i, W04) is Empty or not (Step 703).

When data becomes existing in the data area (D, i, W04), it is acknowledged that the Self-Decision has been established and it ends Autopoiesis vector L ((D, i, W04).

When no data exists in the data area (D, i, W03) and it is "Empty," add "1" to the restart counter of the D, i, W04 (Step 704).

Next, make judgment whether a value of the restart counter is below the value fixed in advance, that is, whether the restart is possible or not (Step 705).

When the restart is possible, set the restart flag (D, i, W04) (Step 706).

When the restart is not possible, set the refusal flag (D, i, W04) (Step 707). On the other hand, with Step 701, if data already exists and it is not "Empty," make judgment on whether the W02 refusal flag of the corresponding word or the W03 refusal flag of the corresponding word has been set or not (Step 708).

When the W02 refusal flag of the corresponding word or the W03 refusal flag of the corresponding word has been set, reset a refusal flag, and set a refusal code as well. (Step 709).

Figure 10:
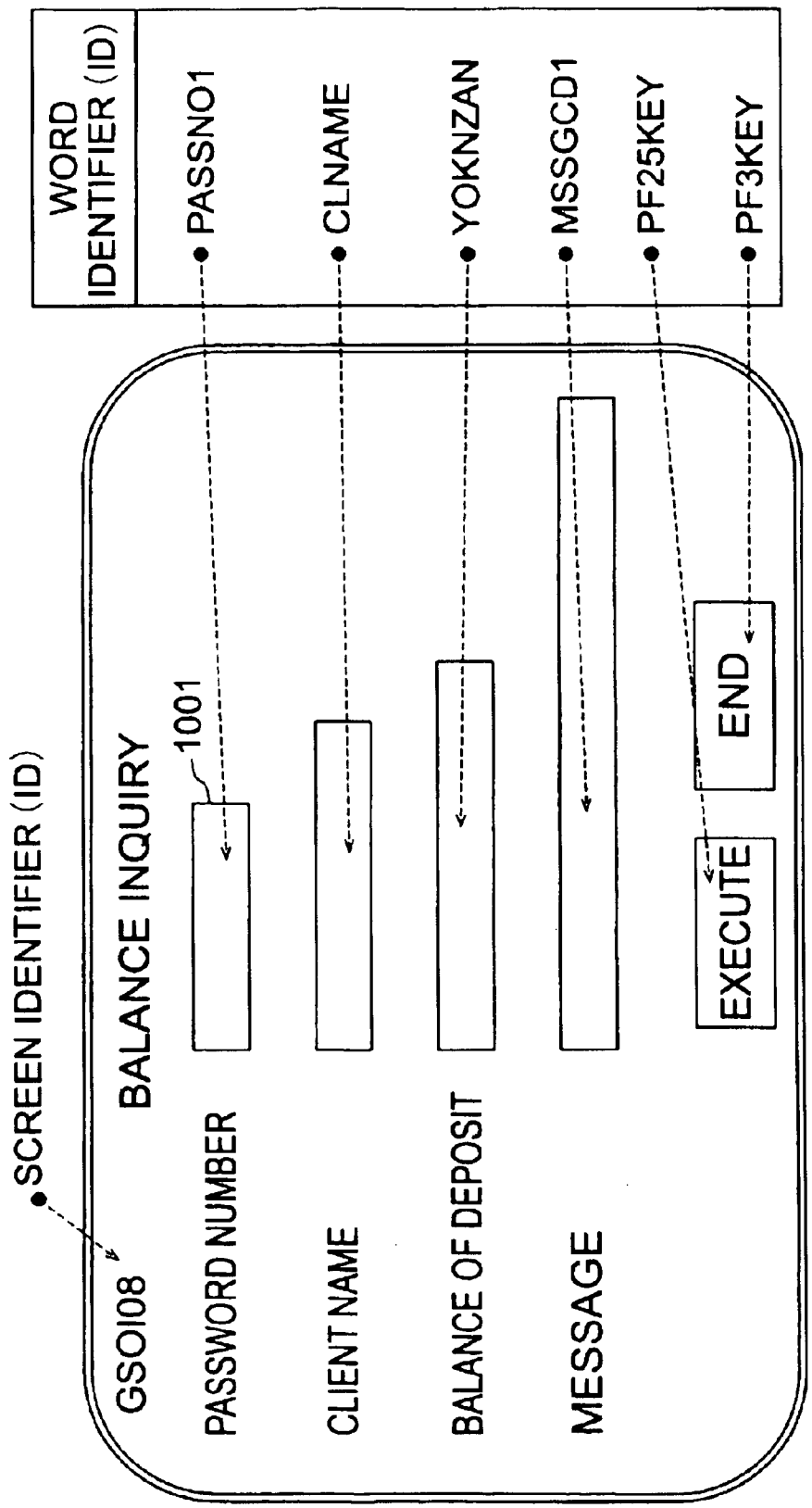
FIG. 10 is a diagram showing an example of Definitive of this invention.

Further to add, the refusal code is used, for example as shown in FIG. 10, in order to indicate in the data area of 'Message' to the effect that an erroneous number has been entered into the data area 1001 of 'password number'. When a refusal code has been set in the W04 Autopoiesis vector of the 'password number', the effect is displayed by the 'Self-Decision of data' of the W04 Autopoiesis vector of 'Message'.

This invention is to automatically create programs having the Palette Function shown in FIG. 3 and with the Duplication element and the Autopoiesis vector shown in FIG. 4 to FIG. 7. The Pallet Chain Function can always be structured by the same program, thus programs of the Palette Function and of the Duplication element and the Autopoiesis vector can be created automatically, which means that software to be aimed can be created automatically. And, since any of the Palette Function, and the Duplication element and the Autopoiesis vector has realized logic only by the address of the data area which can be identified by an identifier of their respective words, it means that software for all fields, including business software, games software, etc., can be created automatically.

Figure 8:
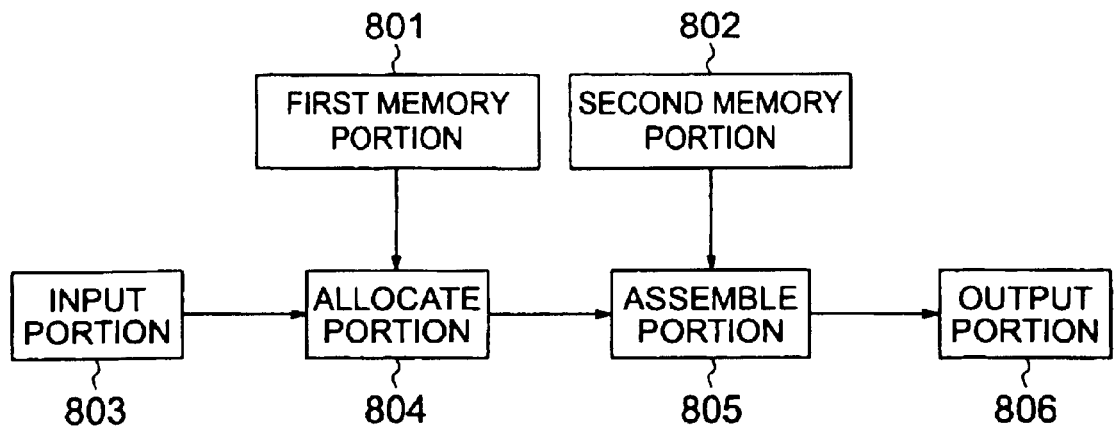
FIG. 8 is a composite diagram of the automatic creation scheme of this invention.

FIG. 8 is a block diagram showing a composition of the automatic creation scheme of software of this invention.

This automatic creation scheme of software can be realized on a computer by software.

In FIG. 8, 801 is a program having Duplication element, Autopoiesis vector and Palette Function shown in FIG. 4 to FIG. 7, and includes the 'data Self-Decision' part, the 'process route' part, and the first memory part to memorize, in advance, a program with 'D, i' yet undefined, 802 includes the second memory part to memorize, in advance, a program having the Pallet Chain Function, and 803 includes the 'data Self-Decision' part, the 'process route' part and the input part to enter 'D, i'.

Also, 804 includes the 'data Self-Decision' part which was entered with 803 and the allocating part to allocate the 'process route' part and the 'D, i' into the prescribed position of a program of Duplication element, Autopoiesis vector and Palette Function which were memorized into the first memory part 801, and 805 includes the 'data Self-Decision' part, the 'process route' part and the assembly part to build in a program of Duplication element, Autopoiesis vector and Palette Function, with 'D, i' defined, into the Pallet Chain Function, and 806 includes an output part to output software which software has been assembled into.

Figure 9:
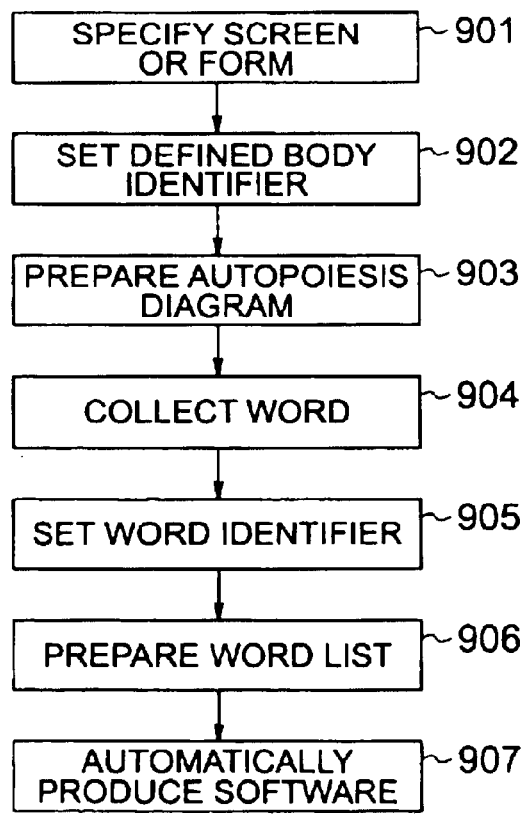
FIG. 9 is a diagram showing a software creation procedure concerned with this invention.

Next, by using FIG. 9, the explanation is made on the procedure to create software by using the scheme structured in this way.

First, specify screens and vouchers used by an aimed software (Step 901) and set identifiers (definitive identifiers) to respective screens (Step 902). FIG. 10 is an example of screens determined. In FIG. 10's screen, set unique identifiers optional within the range of the system, for example, an definitive identifier 'GSOI08'. Also, a blank column in FIG. 10 indicates a data field.

Next, create a process route and determine a File (Step 903). The process route diagram (or called Homogeneity Map) is created based on screens and vouchers which were determined. The process route diagram can be created either humanly or mechanically. The process route diagram is what connects palettes (indicated in boxes) corresponding to respective screens and vouchers, by using lines. Lines mean Pallet Chain Function. If screens and vouchers have been determined, the between-palette connections can be palette a process route is determined.

The "W03" is one piece of W03 in the system, and by this W03 palette, a deposit balance is calculated. The calculated deposit balance is displayed in the balance inquiry screen GSOI08 after the execution of Duplication element and Autopoiesis vector of W04 palette.

Based on a created process route diagram, a necessary File is determined. That is, the necessary File can be inevitably determined by the process route diagram (for example, in FIG. 11, "FSHINFIL". The "FSHINFIL" means a definitive identifier of the "Client Ledger File", and "FMOTOFIL" means a definitive identifier of the "Deposit Ledger File"). Files determined are specified in the process route diagram.

Further to add, the "IO-W04-RK1-SEC" is a subroutine identifier on the W04 palette which leads data from the "Client Ledger File". The "IO-W04-RD1-SEC" is a subroutine identifier on the W04 palette which leads data from the "Deposit Ledger File". The "IO-W02-RK1-SEC" is a subroutine identifier on the W02 palette which leads data from the "Client Ledger File". The "IO-W03-RK1-SEC" is a subroutine identifier on the W03 palette which leads data from the "Client Ledger File". The "IO-W03-RD1-SEC" is a subroutine identifier on the W03 palette which leads data from the "Deposit Ledger File". The above mentioned applies to FIG. 1 in the same way.

Next, collect words from screens, vouchers an files, which were specified (Step 904) and assign identifiers to respective words (Step 905). For example, collect words from the screen of FIG. 10, such as "password number", "client name", "deposit balance", "message", "Execute", "End", and assign, for example, "PASSNO1", "CLNAME", "YOKNZAN", "MSSGCD1", "PF25KEY", "PF3KEY" respectively to "password number", "client name", "deposit balance", "message", "Execute", "End".

FIG. 12 is a diagram showing an example of definition tables which are entered from the input part 803. This definition table is displayed, for example, on the computer screen and each data is entered therefrom.

In the definition table, there are an input column of screen identifiers (ID), an input column of screen names and an input column of word designations. Also, there are input items for each word designation, such as word identifier (ID), whether data is an input or output attribute (I/O), number of columns of data, whether a data attribute is numeric or letter (attribute) type, file to use (as above-mentioned, the reproduction of memorized data occurs in different reproduction original files for every word, so it is done by the subroutine of the Self-Decision part of Autopoiesis vector of every word. From this reason, files to use are defined for every word.), process route (R-NO), function key number (F-KEY) corresponding to process route-determinant words, next screen identifier, word definition (data Self-Decision). With the word-definition (data Self-Decision) input item, when data is an input attribute, it can be determined automatically by the LYEE principle, so nothing is defined. When data is an output attribute, the only following is defined: for example, data is Self-Decision from the data of the same word in File, or by using calculation equation for the "Self-Decision by the operation of data from the other word", for example, "Deposit Balance" (=File's deposit balance+Screen's business amount). More concretely, an example of the "Self-Decision from the data of the same word in File" is such as "Client Name" and "Deposit Balance".

Also, an example of the "Self-Decision by the operation of data from other word" is "Deposit Balance" (=File's deposit balance+Screen's business amount).

With the input item of process route, set the above-mentioned process route (R=1–5).

The "Inducing Data" meant by this invention corresponds to data induced by the above-mentioned word definition (data Self-Decision).

Also, the "process route" meant by this invention corresponds to the above-mentioned process route (R-NO), function key number (F-KEY) and the next screen identifier.

Then, execute the Self-Decision of software by the burying parts of 804 and 805 (Step 907).

Figure 13:
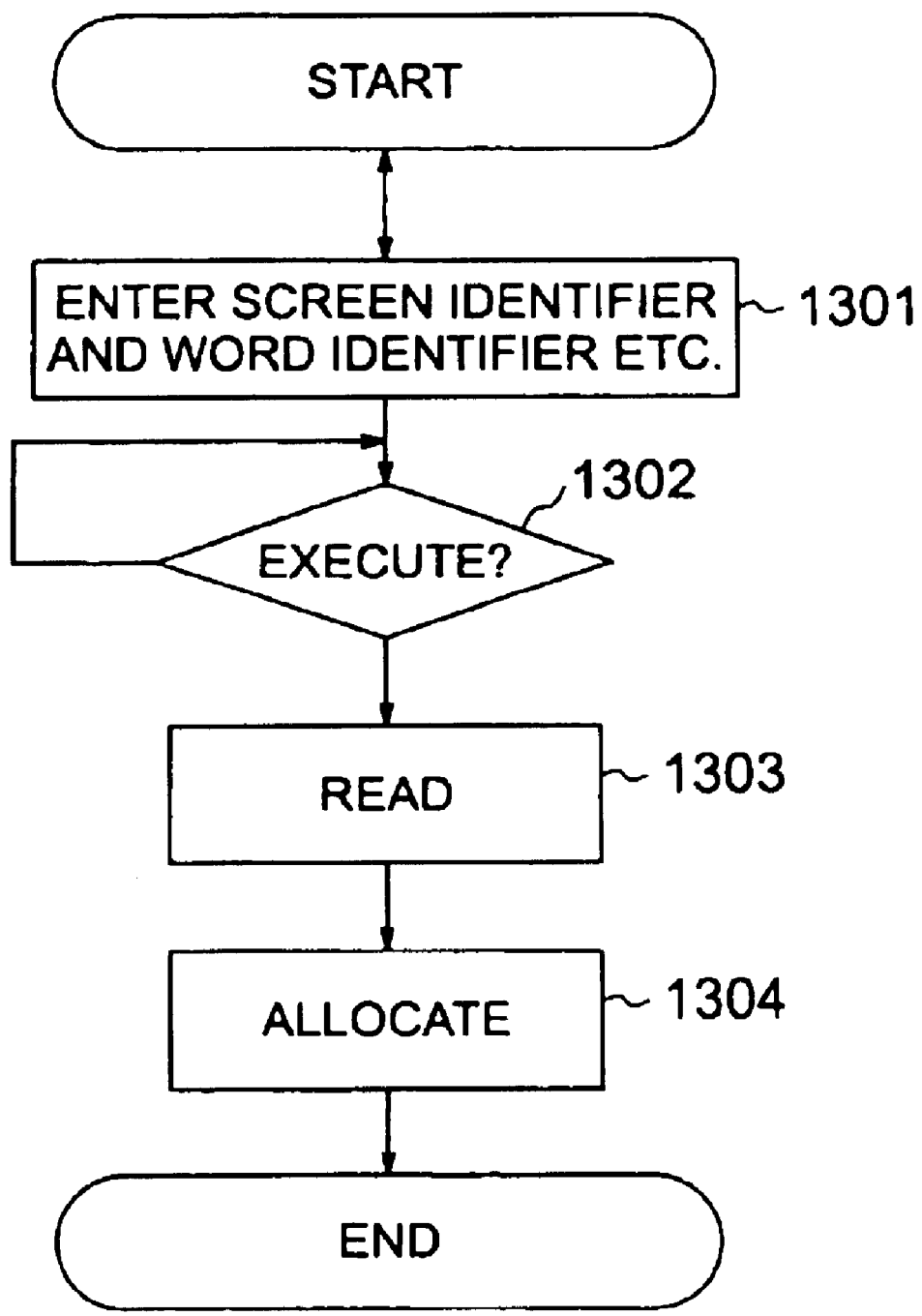
FIG. 13 is a flow chart showing movements of the conversion part of this invention.

The movement of this Self-Decision is explained based on the flowchart of FIG. 13.

That is, when screen identifiers, word identifiers, etc., i.e., the 'data Self-Decision' part meant by this invention, the 'process route' part and 'D, i' are entered (Step 1301) and when the Self-Decision is executed (Step 1302), the 'data Self-Decision' part', the 'process route' and the 'D, i' read in undefined Duplication element, Autopoiesis vector and Palette Function from the allocating part 801 (Step 1303), and the 'data Self-Decision' part, the 'process route' part and 'D, i', set in the definition table, are respectively allocated into the prescribed locations of the undefined Duplication element, Autopoiesis vector and Palette Function (Step 1304).

This point is explained hereunder more concretely.

A program of the undefined W03 Autopoiesis vector is as follows.

```
*--------------------------------------------------------
*       @%8@
*--------------------------------------------------------
L-W03-@%16@-@%19@-SEC SECTION
L-W03-@%16@-@%19@-START
*--< Significance judgment>--
    IF   @%16@-@%19@  OF W03   NOT = @%20@
        GO   TO   L-W03-@%16@-@%19@-EXIT
    END-IF.
*--< Self-Decision>--
*--< Set W02, when input attribute>--
*       MOVE    @%16@-@%19@      OF    W02
*        TO     @%16@-@%19@      OF    W03.
*--<When output attribute, Self-Decision therefrom if same
word in File>--
*       MOVE    G#####   OF    W03
*        TO     F#####   OF    F#####-REC.
*       PERFORM   IO-W03-RD*-SEC.
*       IF    RD*-INVS   =  "IV"
*           MOVE    @%20@ TO @%16@-@%19@  OF   W03
*       ELSE
*           MOVE   F#####-@%19@  OF   F#####-REC
*            TO       @%16@-@%19@    OF    W03
*       END-IF.
*--<When output attribute, Self-Decision by operation with
other word>--
*       COMPUTE    @%16@-@%19@ OF     W03
*                = ###-### OF       W03
*                + ***-*** OF       W03.
*--< Acceptance judgment>--
    IF     @%16@-@%19@      OF   W03   = @%20@
        OR  @%16@-@%19@ OF   W03   > 0
        ADD   1   TO   @%16@-@%19@-CNT   < RECALL-MAX
        IF      @%16@-@%19@-CNT   < RECALL-MAX
            MOVE    "1"   TO    RECALL-MAX
        ELSE
            MOVE    "1"   TO   @%16@-@%19@-NON
        END-IF
    END-IF.
L-W03-@%16@-@%19@-EXIT.
    EXIT.
```

In this undefined W03 Autopoiesis vector program,

@%8@ is a word designation,

@%16@ is a screen identifier,

@%19@ is a word identifier,

@%20@ is an "Empty' value corresponded to an attribute,

F##### is a definitive identifier becoming a key for File access,

G##### is a definitive identifier of the screen where words becoming a key for File access, RD# is an identifier inherent to the subroutine corresponded to File to access,

**** is a word identifier becoming a key for File access,

-### and *-* represent word identifiers of independent variables to an operation.

And, the following columns of the definition table shown in FIG. 12 make their correspondences as below:

Word designation column to @%8@

Screen identifier column to @16@

Word identifier column to @%19@

Attribute column to @%20@ and, Word definition column corresponds to:

```
*--< Self-Decision>--
*--< Set W02, when input attribute>--
*       MOVE    @%16@-@%19@       OF    W02
*        TO     @%16@-@%19@       OF    W03.
*--< When output attribute, Self-Decision therefrom if same
word in File>--
*       MOVE    G#####   OF    W03
*        TO     F#####   OF    F#####-REC.
*       PERFORM   IO-W03-RD*-SEC.
*       IF   RD*-INVS   =  "IV"
*           MOVE    @%20@ TO @%16@-@%19@   OF   W03
*       ELSE
*           MOVE   F#####-@%19@  OF   F#####-REC
*            TO     @%16@-@%19@    OF    W03
*       END-IF.
*--< When output attribute, Self-Decision by operation with
other word>--
*       COMPUTE   @%16@-@%19@  OF W03
*                = ###-### OF      W03
*                + ***-*** OF      W03.
    Among those,
*--< Set W02, when input attribute>--
*       MOVE    @%16@-@%19@       OF    W02
 *       TO     @%16@-@%19@       OF    W03.
``` is the program part to shift data of the data area (D, i, Wn)−1 into the data area (D, i, Wn),

```
*--<When output attribute, Self-Decision therefrom if same
word in File>--
*       MOVE    G#####   OF    W03
*        TO     F#####   OF    F#####-REC.
*       PERFORM   IO-W03-RD*-SEC.
*       IF   RD*-INVS   =  "IV"
*           MOVE    @%20@   TO   @%16@-@%19@  OF   W03
*       ELSE
*           MOVE   F#####-@%19@ OF F#####-REC
*            TO     @%16@-@%19@   OF    W03
*       END-IF.
``` is the program part to perform Self-Decision of data from data of the same word in File,

```
*--<When output attribute, Self-Decision by operation with
other word>--
*       COMPUTE    @%16@-@%19@     OF W03
*                = ###-### OF       W03
*                + ***-***  OF      W03.
``` is the program part to perform Self-Decision of data by operation from data of other word.

Then, when screen identifiers, etc. are set in the definition table, to each column of undefined Autopoiesis vector for every word, @%18@, @%16@, @%19@, @%20@, #####, ###, ##, #, *, ***, ###-###, *-*** , their values are set, and the below-mentioned W03 Autopoiesis vector for every word, that is, a complete W03 Autopoiesis vector program is created.

```
*
*--------------------------------------------------------
*       Password Number
*--------------------------------------------------------
    L-W03-GSOI08-PASSNO1-SEC       SECTION.
    L-W03-GSOI08-PASSNO1-START.
    *--< significance judgment>--
```

-continued

```
        IF    GSOI08-PASSNO1   OF   W03   NOT =
        LOW-VALUE
            OR    TO    L-W03-GSOI08-PASSNO1-EXIT
        END-IF.
    *--< Self-Decision>--
*--< Set W02, when input attribute>--
*       MOVE    GSOI08-PASSNO1    OF    W02
*         TO    GSOI08-PASSNO1    OF    W03
*--< Acceptance judgment>--
        IF    GSOI08-PASSNO1    OF    W03   = LOW-VALUE
*         OR    GSOI08-PASSNO1   OF    W03   > 0
            ADD   1    TO    GSOI08-PASSNO1-CNT
            IF   GSOI08-PASSNO1-CNT    <   RECALL-MAX
                MOVE    "1"    TO    RECALL-FLG
            ELSE
                MOVE    "1"    TO    GSOI08-PASSNO1-NON
            END-IF
        END-IF.
L-W03-GSOI08-PASSNO1-EXIT.
    EXIT.
*------------------------------------------------------------
    * Client Name
*------------------------------------------------------------
L-W03-GSOI08-CLNAME-SEC       SECTION.
L-W03-GSOI08-CLNAME-START.
*--< significance judgment>--
        IF    GSOI08-CLNAME-XX    OF    W03    NOT =
        ALL   "9"
            GO    TO    L-W03-GSOI08-CLNAME-EXIT
        END-IF.
    *--< Self-Decision>--
*--<When output attribute, Self-Decision therefrom if same
word in File>--
*       MOVE    GSOI08- PASSNO1 OF W03
*         TO    FSHINFIL- PASSNO1   OF   FSHINFIL-REC.
*       PERFORM   IO-W03-RK1-SEC.
*       IF    RD1-INVS   =   "IV"
*           MOVE   ALL "9"   TO GSOI08-CLNAME-XX
            OF   W03
*       ELSE
*           MOVE   FSHINFIL-CLNAME OF FSHINFIL-REC
*             TO GSOI08-CLNAME   OF   W03
*           END-IF.
*--<Acceptance judgment>--
        IF GSOI08-CLNAME-XX      OF W03   = ALL "9"
*         OR GSOI08-CLNAME-XX    OF W03   > 0
            ADD    1    TO    GSOI08-CLNAME-CNT
            IF    GSOI08-CLNAME-CNT    <   RECALL-MAX
                MOVE    "1"    TO    RECALL-FLG
            ELSE
                MOVE    "1"    TO   GSOI08-CLNAME-NON
            END-IF
        END-IF.
L-W03-GSOI08-CLNAME-EXIT.
    EXIT.
*
*------------------------------------------------------------
    * Deposit Balance
*------------------------------------------------------------
L-W03-GSOI08-YOKNZAN-SEC    SECTION.
L-W03-GSOI08-YOKNZAN-START.
*--< significance judgment>--
        IF    GSOI08-YOKNZAN OF W03 NOT = LOW-VALUE
            GO    TO    L-W03-GSOI08-YOKNZAN-EXIT
        END-IF.
    *--< Self-Decision>--
*--< When output attribute, Self-Decision therefrom if same
word in File>--*    MOVE    GSOI08- PASSNO1   OF    W03
*         TO    FMOTOFIL- PASSNO1    OF    FMOTOFIL-REC.
*       PERFORM   IO-W03-RD1-SEC.
*       IF    RD1-INVS   =   "IV"
*           MOVE   ALL "9"   TO GSOI08-CLNAME-XX
            OF   W03
*       ELSE
*           MOVE   FMOTOFIL-YOKNZAN OF FMOTOFIL-REC
*             TO    GSOI08-YOKNZAN   OF W03
*           END-IF.
*--<Acceptance judgment>--
        IF   GSOI08-YOKNZAN    OF    W03   = LOW-VALUE
*         OR    GSOI08-YOKNZAN       OF W03   > 0
            ADD 1   TO GSOI08-YOKNZAN-CNT
            IF    GSOI08-YOKNZAN-CNT    <    RECALL-
            MAX
                MOVE    "1"    TO    RECALL-FLG
            ELSE
                MOVE    "1"    TO    GSOI08-YOKNZAN-NON
            END-IF
        END-IF.
L-W03-GSOI08-YOKNZAN-EXIT.
    EXIT.
*
*------------------------------------------------------------
    * End
*------------------------------------------------------------
L-W03-GSOI08-PF3KEY-SEC    SECTION.
L-W03-GSOI08-PF3KEY-START.
*--< significance judgment>--
        IF    GSOI08-PF3KEY OF   W03    NOT =
        LOW-VALUE
            GO    TO    L-W03-GSOI08-PF3KEY-EXIT
        END-IF.
    *--< Self-Decision>--
*--< No Self-Decision
*--<Acceptance judgment>--
        IF   GSOI08-PF3KEY    OF    W03   = LOW-VALUE
*         OR    GSOI08-PF3KEY       OF    W03   > 0
            ADD 1    TO    GSOI08-PF3KEY-CNT
            IF    GSOI08-PF3KEY-CNT < RECALL-MAX
                MOVE    "1"    TO    RECALL-FLG
            ELSE
                MOVE    "1"    TO    GSOI08-PF3KEY-NON
            END-IF
        END-IF.
L-W03-GSOI08-PF3KEY-EXIT.
    EXIT.
*
*------------------------------------------------------------
*    EXECUTE
*------------------------------------------------------------
L-W03-GSOI08-PF25KEY-SEC    SECTION.
L-W03-GSOI08-PF25KEY-START.
*--< significance judgment>--
        IF    GSOI08-PF25KEY OF W03 NOT = LOW-VALUE
            GO    TO    L-W03-GSOI08-PF25KEY-EXIT
        END-IF.
    *--< Self-Decision>--
*--< No Self-Decision
*--<Acceptance judgment>--
        IF   GSOI08-PF25KEY        OF W03    = LOW-VALUE
*         OR    GSOI08-PF25KEY       OF    W03   > 0
            ADD    1    TO GSOI08-PF25KEY-CNT
            IF    GSOI08-PF25KEY-CNT    <   RECALL-MAX
                MOVE    "1"    TO    RECALL-FLG
            ELSE
                MOVE    "1"    TO    GSOI08-PF25KEY-NON
            END-IF
        END-IF.
L-W03-GSOI08-PF25KEY-EXIT.
    EXIT.
```

Also, the undefined W03 Duplication element is as follows:

```
*------------------------------------------------------------
*    @%8@
*------------------------------------------------------------
Y-W03-@%16@-@%19@-SEC    SECTION
Y-W03-@%16@-@%19@-START
    IF   @%16@-@%19@   OF W02    NOT = @%20@
        MOVE      @%16@-@%19@      OF    W02
           TO     @%16@-@%19@      OF    W03
    END-IF.
Y-W03-%16@-@%19@-EXIT.
    EXIT.
```

Then, per every word, to each column of the undefined W03 Duplication element, respective values are set, and the W03 Duplication element for every word as shown below, i.e., a complete W03 Duplication element program is created.

```
*------------------------------------------------------------
*   Password Number
*------------------------------------------------------------
Y-W03-GSOI08-PASSNO1-SEC    SECTION.
Y-W03-GSOI08-PASSNO1-START.
    IF   GSOI08-PASSNO1 OF W02    NOT = LOW-VALUE
         MOVE      GSOI08-PASSNO1    OF    W02
            TO     GSOI08-PASSNO1    OF    W03
    END-IF.
Y-W03-GSOI08-PASSNO1-EXIT.
    EXIT.
*
*------------------------------------------------------------
*   Client Name
*------------------------------------------------------------
Y-W03-GSOI08-CLNAME-SEC    SECTION.
Y-W03-GSOI08-CLNAME-START.
    IF     GSOI08-CLNAME-XX       OF W02    NOT = ALL "9"
         MOVE       GSOI08-CLNAME    OF    W02
            TO      GSOI08-CLNAME    OF    W03
    END-IF.
Y-W03-GSOI08-CLNAME-EXIT.
    EXIT.
*
*------------------------------------------------------------
*   Deposit Balance
*------------------------------------------------------------
Y-W03-GSOI08-YOKNZAN-SEC    SECTION.
Y-W03-GSOI08-YOKNZAN-START.
    IF   GSOI08-YOKNZAN    OF W02NOT = LOW-VALUE
         MOVE       GSOI08-YOKNZAN    OF    W02
            TO      GSOI08-YOKNZAN    OF    W03
    END-IF.
Y-W03-GSOI08-YOKNZAN-EXIT.
    EXIT.
*
*------------------------------------------------------------
*   Message
*------------------------------------------------------------
Y-W03-GSOI08-MSSGCD1-SEC    SECTION.
Y-W03-GSOI08-MSSGCD1-START.
    IF   GSOI08-MSSGCD1       OF W02NOT = LOW-VALUE
         MOVE       GSOI08-MSSGCD1    OF    W02
            TO      GSOI08-MSSGCD1    OF    W03
    END-IF.
Y-W03-GSOI08-MSSGCD1-EXIT.
    EXIT.
*
*------------------------------------------------------------
*   End
*------------------------------------------------------------
Y-W03-GSOI08-PF3KEY-SEC    SECTION.
Y-W03-GSOI08-PF3KEY-START.
    IF   GSOI08-PF3KEY    OF W02 NOT = LOW-VALUE
         MOVE       GSOI08-PF3KEY    OF    W02
            TO      GSOI08-PF3KEY    OF    W03
    END-IF.
Y-W03-GSOI08-PF3KEY-EXIT.
    EXIT.
*
*------------------------------------------------------------
*   Execute
*------------------------------------------------------------
Y-W03-GSOI08-PF25KEY-SEC    SECTION.
Y-W03-GSOI08-PF25KEY-START.
    IF   GSOI08-PF25KEY    OF W02NOT = LOW-VALUE
         MOVE       GSOI08-PF25KEY    OF    W02
            TO      GSOI08-PF25KEY    OF    W03
    END-IF.
Y-W03-GSOI08-PF25KEY-EXIT.
    EXIT.
```

The undefined W03 Autopoiesis vector group is as follows:

```
*--< @%8@
        PERFORM L-W03-@%16@-@%19@-SEC.
```

The undefined W03 Duplication element group is as follows:

```
*--< @%8@
        PERFORM Y-W03-@%16@-@%19@-SEC.
```

Also, the undefined Palette Function is as follows:

```
ENVIRONMENT DIVISION.
CONFIGURATION SECTION.
    SOURCE-COMPUTER.          AS400.
    OBJECT-COMPUTER           AS400.
INPUT-OUTPUT                  SECTION.
FILE-CONTROL.
*
*--KEY available--*
    SELECT @%16@     ASSIGN    TO DATABASE-@%16@
                     ORGANIZATION IS INDEXED
                     ACCESS MODE IS DYNAMIC
                     RECORD KEY IS EXTERNALLY-
                     DESCRIBED-KEY
*                    WITH DUPLICATES
                     FILE   STATUS IS  @%24@.
    *-- No KEY--*
*   SELECT @%16@     ASSIGN    TO DATABASE-@%16@
*                    ORGANIZATION IS SEQUENTIAL
*                    ACCESS MODE IS SEQUENTIAL
*                    FILE   STATUS IS  @%24@.
DATA DIVISION.
FILE SECTION.
FD @%16@
    LABEL RECORD IS STANDARD.
01 @%16@-R.
    COPY DDS-ALL-FORMATS OF @%16@.
    COPY      @%16@.
*******************************************************
WORKING-STORAGE      SECTION.
*******************************************************
01  PALETTE-WORK.
    03      PS           PIC         S9(03) COMP.
01  WK-FILES-STATUS.
    03      @%24@        PIC         X(02).
01  FILE-STATUS.
    03      @%7@-OPNS PIC            X(01)
    03      @%7@-REDS PIC            X(01).
    03      @%7@-INVS PIC            X(02).
*--<Used for W03           screen CLEAR.
01  WK-@%16@.
    COPY   @%16@.
*******************************************************
LINKAGE SECTION.
*******************************************************
*--< CTRL >--*
01  CTRL-AREA.
    COPY   CTRLAREA.
*--< W02 >--*
01  W02-AREA.
    02  W02  OCCURS  5.
    COPY     W0204.
*                              --< Screen >--
    03  W02-@%16@ REDIFINES  INFO.
        COPY  @%16@.
    03  @%16@-NON REDEFINES NON-FLG.
        COPY  @%16@N.
*--< W03 >--*
01  W03-AREA.
    02  W03.
```

-continued

```
            --< I/F INFO >--
    03    W03-CTRL.
          05   RECALL-FLG          PIC X(1).
          05   RECALL-MAX          PIC 9(2).
*         --< Word >--
    03    W03-ITEMS.
          04    W03-@%16@.
                COPY       @%16@.
          04    W03-FILE.
                COPY       @%16@.
          04    W03-LIST.
                COPY       @%16@.
*         --< Refusal Flag >--
    03    W03-NON.
          COPY         @%16@N.
          COPY         @%16@N.
          COPY         @%16@N.
*         --< Restart Frequency >--
    03    W03-CON.
          COPY         @%16@Z.
          COPY         @%16@Z.
          COPY         @%16@Z.
*--< W04 >--*
01  W04-AREA.
    02    W04    OCCURS   5.
          COPY W0204.
*         --< Screen >--
    03    W04-@%16@ REDEFINES  INFO.
          COPY      @%16@.
    03    OPTION-IDX-DEF REDEFINES  OPTION-IDX.
          COPY      @%16@C.
*--< WFL >--
01  WFL-AREA.
    03    FILLER                   PIC X(01)
***************************************************************
PROCEDURE DIVISION  USING  CTRL-AREA
                           W02-AREA
                           W03-AREA
                           W04-AREA
                           WFL-AREA.
*               *****************************
*               *         MAIN              *
*               *****************************
MAIN-SEC SECTION.
MAIN-START.
*--< Initial process >--
    PERFORM    INIT-PROC.
*--< Duplication element >--
    PERFORM    Y-PROC.
*--< Autopoiesis vector >--
    PERFORM    UNTIL  RECALL-FLG10 =  SPACE
                MOVE   SPACE   TO RECALL-FLG
                PERFORM   L-PROC
    END-PERFORM.
*--< Pwrite
    PERFORM    IO-W03-WT*-SEC.
    PERFORM    IO-W03-UP*-SEC.
*--< Finish process >--
    PERFORM    FIN-PROC.
MAIN-END.
    EXIT PROGRAM.
*               *****************************
*               *    Initial process        *
*               *****************************
INIT-PROCSECTION.
INIT-START.
*--<Initial value setting >--
    INITIALIZE     PALETTE-WORK.
    INITIALIZE     WK-FILES-STATUS.
    INITIALIZE     FILES-STATUS.
    MOVE  SPACE  TO  FLAME-FLG  OF  CTRL-AREA.
    MOVE  05               TO  RECALL-MAX.
    MOVE  HIGH-VALUE  TO RECALL-FLG.
*--<Stage No. setting >--
    MOVE  STAGE-NO  OF  CTRL-AREA    TO  PS.
    IF         (PS < 1) OR (PS > 5)
               MOVE   "STAGEERR" TO MSG-NO
    END-IF.
*--< Screen item "EMPTY" setting >--(LOW-VALUE / ALL "9")
          MOVE      LOW-VALUE     TO   WK-@%1@.
*--< W03 "EMPTY" setting >--(LOW-VALUE / ALL "9")
          MOVE      LOW-VALUE     TO   WK-ITEMS.
          MOVE      WK-@%1@ TO   W03-@%1@.
*--< Initialization >--
          INITIALIZE           W03-NON.
          INITIALIZE           W0-3-CNT.
INIT-EXIT.
    EXIT.
*         *****************************
*         *   Duplication element     *
*         *****************************
Y-PROC     SECTION.
Y-START.
*--< @%1@
    COPY      @%1@.
Y-EXIT.
    EXIT.
*         *****************************
*         *    Autopoiesis vector     *
*         *****************************
L-PROC     SECTION.
L-START.
*--< @%1@
    COPY      @%1@.
L-EXIT.
    EXIT.
*         *****************************
*         *     Finish process        *
*         *****************************
FIN-PROC SECTION.
FIN-START.
*--< FILE COLSE >--
FIN-EXIT.
    EXIT.
*         *****************************
*         * Duplication element - section group *
*         *****************************
*--< @%1@
    COPY      @%1@.
*         *****************************
*         * Autopoiesis element - section group *
*         *****************************
*--< @%1@
    COPY      @%1@.
*         *****************************
*         *        FILE I/O           *
*         *****************************
*         *****************
*         * Read subroutine
*         *****************
*--< Seuqential   READ   ?@%8@ >--
IO-W03-@%7@-SEC   SECTION.
IO-W03-@%7@-START.
          IF        @%7@-OPEN      NOT =    "1"
                    OPEN INPUT     @&16@
                    MOVE "1"   TO  %7@-OPNS
          END-IF.
          READ  @%16@     AT END
                          MOVE  "E"  TO F-REND
                          GO  TO  IO-W03-@%7@-EXIT
                END-READ.
IO-W03-@%7@-EXIT.
    EXIT.
*--< KEY   READ   ?   @%8@ >--
IO-W03-@%7@-SEC   SECTION.
IO-W03-@%7@-START.
          IF        @%7@-OPNS NOT =    "1"
                    OPEN INPUT      @%16@
                    MOVE "1"   TO   @%7@=OPNS
          END-IF.
          IF        @%7@-REDS NOT = "1"
                    READ  @%16@     INVALID
                    MOVE  "IV"  TO  @%7@-INVS
                    GO   TO     IO-W03-@%7@-EXIT
          END-READ
                    MOVE  "1"   TO   @%7@-REDS
IO-W03-@%7@-EXIT.
    EXIT.
```

-continued

```
*                  ******************
*                  * Write subroutine
*                  ******************
*--< WRITE   @%8@ >--
IO-W03-@%7@-SEC      SECTION.
IO-W03-@%7@-START.
     IF      @%7 @-OPNS      NOT =     "1"
             OPEN OUTPUT            @%16@
             MOVE "1"         TO    @%7@-OPNS
     END-IF.
     WRITE   @%16@-REC       INVALID
             MOVE "IV" TO     @%7@-INVS
             GO TO            IO-W03-@%7@-EXIT
     END-WRITE.
IO-W03-@%7@-EXIT.
     EXIT.
*                  ******************
*                  * Update subroutine
*                  ******************
IO-W03-@%7@-SEC   SECTION.
IO-W03-@%7@-START.
*--< KEY   READ  10 ?  @%8@ >--
     IF      @%7@-OPNS        NOT =     "1"
             OPEN I-O                @%16@
             MOVE "1"         TO    @%7@-OPNS
     END-IF.
*    --< key setting >--
             MOVE WFL-RD?-KEY-#1 TO key setting area
             READ  @%16@      INVALID
             MOVE "IV" TO     @%7@-INVS
             GO  TO           IO-W03-@%7@-EXIT
             END-READ.
*--< UPDATE   ?  @%8@ >--
     IF      @%7@-INVS         NOT =      "IV"
             REWRITE  @%16@-REC      INVALID
                MOVE  "IV"       TO    @%7@-INVS
                GO  TO              IO-W03-@%7@-EXIT
             END-REWRITE
     END-IF.
     IO-W03-@%7@-EXIT.
        EXIT.
     *
```

Further to add, in the above programs, the following correspondences are made:
%24 to %16+STS,
%17 to the name of the definition table file,
%9 to a word identifier of the definition table file,
%7 to R-NO of the definition table file,
%1 to W)n.

Also with above undefined W03 Autopoiesis vector group and W03 Duplication element group, undefined W03 Palette Function, the definition is made in the same way, and a program is created.

Also, with W02 Autopoiesis vector, W02 Palette Function, W04 Autopoiesis vector, W904 Duplication element and W04 Palette Function, a program is created automatically in the same way.

Then, programs having these Duplication element and Autopoiesis vector and Palette Function are assembled into the Pallet Chain Function by the assembly part 805 and are output from the output part 806.

As explained above, in this invention, any of Pallet Function, Duplication element, and Autopoiesis vector can realize its logic only by the address of the data area identified by the word identifier, therefore, the automation of the creation of software of all fields such as business software, games software and other software is possible, and, moreover, software created can achieve the enhancement of the productivity, the uniformity of the quality, and the ease of the maintenance.

INDUSTRIAL APPLICABILITY

As mentioned above, the software creation device and the software creation method of this invention has realized logic only by means of the address of the data area which is identified by the word identifier, as for Pallet Function, Duplication element and Autopoiesis vector, respectively, while having realized the automation of the software creation at ease, therefore it is useful to create software for all fields, including business software, games software and others, and at the same time, it is also useful in the maintenance of software. It is suited to the creation and maintenance of software requiring the productivity, quality uniformity, maintainability, in particular.

What is claimed is:

1. A software creation devise, said software comprising:
   (a) means for having W04 Duplication element and W04 Autopoiesis vector for performing screen editing, W02 Autopoiesis vector for determining the process route, W03 Duplication element and W03 Autopoiesis vector for performing data editing for file update, all of which have an indefinitive part to be allocated with a definitive identifier and a word identifier corresponding respectively to screen, file or voucher (screen, file and voucher being called 'definitive' hereinafter) necessary for software to be produced, and to the word existing on the definitive at the same time are defined as universal structure regardless of the kinds or the functions of the software, wherein:
   (a-1) the W04 Duplication element, if the data area of W03 identified by the same word's identifier is not "empty", sets a data value of W03 data area identified by the same word identifier into the data area identified by the word identifier of the W04;
   (a-2) the W04 Autopoiesis vector, if the data area of W04 identified by the word identifier is not "empty" and when a refusal flag of W02 or W03 identified by the same word identifier has been set, sets a refusal code and resets a refusal flag, and if the data area of W04 identified by the word identifier is "empty", introduces and sets a data into the data area of W04 identified by the word identifier from the data area of W04 identified by an identifier of the other words rather than the word, and, when the restart is possible even if the aforementioned data introduction cannot be done, sets a restart flag or, when restart is not possible, sets a refusal code identified by the same word identifier;
   (a-3) the W02 Autopoiesis vector, if the data area of W02 identified by the word identifier is not "empty", sets a process route flag, and when a process route flag setting is refused and a restart is possible, sets a restart flag, or when a restart is impossible, sets a refusal flag identified by the same word identifier;
   (a-4) the W03 Duplication element, if the data area of W02 identified by the same word identifier is not "empty", sets a data value of W02 data area identified by the same word identifier into the data area identified by the word identifier of the W03;
   (a-5) the W03 Autopoiesis vector, if the data area of W03 identified by the word identifier is "empty", does one of the followings: (i) setting a data from the data area of W02 identified by the word identifier in a predetermined way; or (ii) setting a data from the data area of W03 identified by the word identifier on file in a predetermined way; or (iii) setting a data into the data area of W03 identified by the word by use of the provided calculation equation, and, when the restart is possible even if the aforementioned data setting value cannot be done, sets a restart flag or, when the restart is not possible, sets a refusal flag identified by the same word identifier;

(b) a group of pallets having W04 pallet for putting together executably, per screen, each W04 Duplication element and W04 Autopoiesis vector corresponding to the word identifier of the word existing on the screen into an order of the Duplication element group and the Autopoiesis vector group and for assembling each W04 data area identified by each word identifier; W02 pallet for putting together executably, per screen, each W02 Autopoiesis vector corresponding to the word identifier of the word existing on the screen and for assembling each W02 data area identified by each word identifier; and W03 pallet for putting together executably each W03 Duplication element and W03 Autopoiesis vector corresponding to the word identifier of the word existing on the whole definitive in the system into an order of the Duplication element group and the Autopoiesis vector group and for assembling each W03 data area identified by each word identifier;

(c) W04, W02, and W03 pallet function means for executing each Duplication element and Autopoiesis vector inside the corresponding pallet, and re-executing each Duplication element and Autopoiesis vector inside the pallet if a pallet restart flag in the pallet has been set, each means having an indefinitive part to be allocated with the definitive identifier and the word identifier, at the same time being defined as universal structure regardless of the kinds or the functions of the software;

(d) pallet chain function means for executing the W04 pallet; sending a screen data based on the execution onto a computer screen; receiving a screen data corresponding to the sent screen data and executing the W02 pallet; determining a process route based on the process route flag of the W02 pallet; and executing the W03 pallet accorded in the determined process route, said means defined as universal structure regardless of the kinds or the functions of the software, wherein the software creation device comprises:

memory means for memorizing, in advance, the W04 Duplication element, the W04 Autopoiesis vector, the W02 Autopoiesis vector, the W03 Duplication element, W03 Autopoiesis vector, and the pallet group of the (b), each pallet function means of the (c) and pallet chain function means of the (d), all of whose definitive identifier, word identifier, process route and, if it applies, calculation equation, are undefined;

means for inputting, per the word, the definitive identifier, the word identifier, the process route, input or output attribute of the word and, if it applies, the calculation equation;

allocating means for allocating, per the word, the definitive identifier, the word identifier, the process route, and, if it applies, the calculation equation into the prescribed locations of the memorized undefined W04 Duplication element, W04 Autopoiesis vector, W02 Autopoiesis vector, W03 Duplication element, W03 Autopoiesis vector, the pallet group of (b), the pallet function means of the (c), and for creating, in W03 Autopoiesis vector, a data setting description corresponding to the (i) (ii) (iii) based on input and output attribute to the corresponding word and, if it applies, the calculation equation;

means for obtaining objective software by combining the consequence of the allocating means and the pallet chain function means memorized by the memory means.

2. A software creation method, said software comprising:

(a) means for having W04 Duplication element and W04 Autopoiesis vector for performing screen editing, W02 Autopoiesis vector for determining the process route, W03 Duplication element and W03 Autopoiesis vector for performing data editing for file update, all of which have an indefinitive part to be allocated with a definitive identifier and a word identifier corresponding respectively to screen, file or voucher (screen, file and voucher being called 'definitive' hereinafter) necessary for software to be produced, and to the word existing on the definitive, at the same time are defined as universal structure regardless of the kinds on the functions of the software, wherein:

(a-1) the W04 Duplication element, if the data area of W03 identified by the same word's identifier is not "empty", sets a data value of W03 data area identified by the same word identifier into the data area identified by the word identifier of the W04;

(a-2) the W04 Autopoiesis vector, if the data area of W04 identified by the word identifier is not "empty" and when a refusal flag of W02 or W03 identified by the same word identifier has been set, sets a refusal code and resets a refusal flag, and if the data area of W04 identified by the word identifier is "empty", introduces and sets a data into the data area of W04 identified by the word identifier from the data area of W04 identified by an identifier of the other words rather than the word, and, when the restart is possible even if the aforementioned data introduction cannot be done, sets a restart flag or, when restart is not possible, sets a refusal code identified by the same word identifier;

(a-3) the W02 Autopoiesis vector, if the data area of W02 identified by the word identifier is not "empty", sets a process route flag, and when a process route flag setting is refused and a restart is possible, sets a restart flag, or when a restart is impossible, sets a refusal flag identified by the same word identifier;

(a-4) the W03 Duplication element, if the data area of W02 identified by the same word identifier is not "empty", sets a data value of W02 data area identified by the same word identifier into the data area identified by the word identifier of the W03;

(a-5) the W03 Autopoiesis vector, if the data area of W03 identified by the word identifier is "empty", does one of the followings: (i) setting a data from the data area of W02 identified by the word identifier in a predetermined way; or (ii) setting a data from the data area of W03 identified by the word identifier on file in a predetermined way; or (iii) setting a data into the data area of W03 identified by the word by use of the provided calculation equation, and, when the restart is possible even if the aforementioned data setting value cannot be done, sets a restart flag or, when the restart is not possible, sets a refusal flag identified by the same word identifier;

(b) a group of pallets having W04 pallet for putting together executably, per screen, each W04 Duplication element and W04 Autopoiesis vector corresponding to the word identifier of the word existing on the screen into an order of the Duplication element group and the Autopoiesis vector group and for assembling each W04 data area identified by each word identifier; W02 pallet for putting together executably, per screen, each W02 Autopoiesis vector corresponding to the word identifier of the word existing on the screen and for assembling each W02 data area identified by each word identifier; and W03 pallet for putting together executably each W03 Duplication element and W03 Autopoiesis vector corresponding to the word identifier of the word existing on the whole definitive in the system into an order of the Duplication element group and the Autopoiesis vector group and for assembling each W03 data area identified by each word identifier;

(c) W04, W02, and W03 pallet function means for executing each Duplication element and Autopoiesis vector inside the corresponding pallet, and re-executing each Duplication element and Autopoiesis vector inside the pallet if a pallet restart flag in the pallet has been set; each means having an indefinitive part to be allocated with the definitive identifier and the word identifier, at the same time being defined as universal structure regardless of the kinds or the functions of the software;

(d) pallet chain function means for executing the W04 pallet; sending a screen data based on the execution onto a computer screen; receiving a screen data corresponding to the sent screen data and executing the W02 pallet; determining a process route based on the process route flag of the W02 pallet; and executing the W03 pallet accorded in the determined process route, said means defined as universal structure regardless of the kinds or the functions of the software, wherein the software creation device comprises:

memorizing, in advance, the W04 Duplication element, the W04 Autopoiesis vector, the W02 Autopoiesis vector, the W03 Duplication element, W03 Autopoiesis vector, and the pallet group of the (b), each pallet function means of the (c) and pallet chain function means of the (d), all of whose definitive identifier, word identifier, process route and, if it applies, calculation equation, are undefined;

inputting, per the word, the definitive identifier, the word identifier, the process route, input or output attribute of the word and, if it applies, the calculation equation;

allocating, per the word, the definitive identifier, the word identifier, the process route, and, if it applies, the calculation equation into the prescribed locations of the memorized undefined W04 Duplication element, W04 Autopoiesis vector, W02 Autopoiesis vector, W03 Duplication element, W03 Autopoiesis vector, the pallet group of (b), the pallet function means of the (c), and for creating, in W03 Autopoiesis vector, a data setting description corresponding to the (i) (ii) (iii) based on input and output attribute to the corresponding word and, if it applies, the calculation equation;

obtaining objective software by combining the consequence of the allocation and the pallet chain function means memorized by the memory means.

* * * * *

UNITED STATES PATENT AND TRADEMARK OFFICE
CERTIFICATE OF CORRECTION

PATENT NO. : 6,792,594 B1
DATED : September 14, 2004
INVENTOR(S) : Negoro et al.

It is certified that error appears in the above-identified patent and that said Letters Patent is hereby corrected as shown below:

<u>Title page,</u>
Item [73], should read:
-- [73]  Assignees: Information System Development Institute, Tokyo (JP); The Institute of Computer Based Software Methodology and Technology, Tokyo (JP)  --

Signed and Sealed this

Seventh Day of December, 2004

JON W. DUDAS
*Director of the United States Patent and Trademark Office*